(12) United States Patent
Jain et al.

(10) Patent No.: US 7,860,506 B2
(45) Date of Patent: *Dec. 28, 2010

(54) MODEL AND METHOD FOR COMPUTING PERFORMANCE BOUNDS IN MULTI-HOP WIRELESS NETWORKS

(75) Inventors: Kamal Jain, Bellevue, WA (US); Jitendra D. Padhye, Kirkland, WA (US); Venkata N. Padmanabhan, Bangalore (IN); Lili Qiu, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 86 days.

This patent is subject to a terminal disclaimer.

(21) Appl. No.: 12/273,082

(22) Filed: Nov. 18, 2008

(65) Prior Publication Data

US 2009/0086652 A1 Apr. 2, 2009

Related U.S. Application Data

(62) Division of application No. 10/680,549, filed on Oct. 7, 2003, now Pat. No. 7,469,143.

(51) Int. Cl.
*H04W 40/00* (2009.01)

(52) U.S. Cl. .................. 455/446; 455/423; 455/450; 455/63.1; 455/67.13; 370/238; 370/252; 370/328; 370/338; 370/351

(58) Field of Classification Search .......... 455/423, 455/63.1, 67.13, 445, 446, 450; 370/229, 370/230.1, 237, 238, 252, 254, 255, 310, 370/338, 431, 328, 329, 330, 351
See application file for complete search history.

(56) References Cited

U.S. PATENT DOCUMENTS

| | | | |
|---|---|---|---|
| 5,365,571 A | 11/1994 | Rha et al. | |
| 5,524,136 A * | 6/1996 | Bar-Noy et al. | 455/456.1 |
| 6,377,544 B1 | 4/2002 | Muthukrishnan et al. | |
| 6,377,551 B1 * | 4/2002 | Luo et al. | 370/238 |
| 6,522,885 B1 | 2/2003 | Tang et al. | |

(Continued)

OTHER PUBLICATIONS

Sengoku et al., Cellular Mobile Communication Systems and a Channel assignment using Neural Networks, Aug. 12-14, 1990, Circuits and Systems, 1990, Proceedings of the 33$^{rd}$ Midwest Symposium on, pp. 411-414, ISBN: 0-7803-0081-5.

(Continued)

*Primary Examiner*—Charles N Appiah
*Assistant Examiner*—Olumide T Ajibade Akonai
(74) *Attorney, Agent, or Firm*—Wolf, Greenfield & Sacks, P.C.

(57) ABSTRACT

Disclosed is a general model and method for computing performance bounds in multi-hop wireless networks. Rather than focusing on computing asymptotic performance bounds under assumptions of homogeneity or randomness in the network topology and/or workload, the present invention accommodates any given network, technology, interference model, routing paradigm, and workload. Using a conflict graph to formally characterize the impact of wireless interference on the performance of multi-hop wireless networks, methods for computing upper and lower bounds on the capacity of a given wireless network are detailed. Besides computing network capacity, the model and method disclosed can also enable or benefit other applications including maximizing fairness and minimizing maximum link utilization.

3 Claims, 14 Drawing Sheets

U.S. PATENT DOCUMENTS

| | | | |
|---|---|---|---|
| 6,542,746 B1 | 4/2003 | Dean | |
| 6,614,762 B1* | 9/2003 | Illiadis et al. | 370/252 |
| 6,631,267 B1 | 10/2003 | Clarkson et al. | |
| 6,643,277 B2 | 11/2003 | Garrison et al. | |
| 6,646,989 B1* | 11/2003 | Khotimsky et al. | 370/238 |
| 6,771,966 B1* | 8/2004 | Chow | 455/446 |
| 6,816,585 B1 | 11/2004 | Blatt et al. | |
| 6,829,216 B1* | 12/2004 | Nakata | 370/228 |
| 6,836,467 B2 | 12/2004 | Stanley | |
| 6,950,418 B1 | 9/2005 | Young et al. | |
| 7,251,224 B2* | 7/2007 | Ades et al. | 370/330 |
| 7,469,143 B2* | 12/2008 | Jain et al. | 455/446 |
| 2005/0058111 A1 | 3/2005 | Hung et al. | |
| 2006/0240835 A1 | 10/2006 | Jain et al. | |

OTHER PUBLICATIONS

*Bay area wireless users group*, http://www.bawug.org.
*lp_solve: linear programming code.*, ftp://ftp.ics.ele.tue.nl/pub/lp_solve/.
*Linear Programming.* W.H. Freeman and Company, 1983. [book].
De Couto et al., *Performance of Mutlihop Wireless Networks; Shortest Path is Not Enough.* MIT Laboratory for Computer Science, 1st Workshop on Hot Topics in Networks (Oct. 2002), http://www.pdos.lcs.mit.edu/papers/grid:hotnets02/paper.pdf.
Ilog cplex suite, 2003, http://www.ilog.com/products/cplex/.
Estrin et al., *Next Century Challenges: Scalable Coordination in Sensor Networks*, ACM MOBICOM (Aug. 1999). http://citeseer.nj.nec.com/estrin99next.html.
Garey, et al., *Computers and Intractability: A guide to the theory of {NP} completeness.* W.H. Freeman and Company, (1979) [book].
Gastpar et al., *On The Capacity of Wireless Networks: The Relay Case*, IEEE INFOCOM (Jun. 2002). http://www.ieee-infocom.org/2002/papers/489,pdf.
Grossglauser et al., *Mobility Increases The Capacity Of Ad-Hoc Wireless Networks*, IEEE INFOCOM (Apr. 2001), http://citeseer.nj.nec.com/532243.html.
Gupta et al., *The Capacity Of Wireless Networks*, IEEE Transactions on Information Theory 46, 2 (Mar. 2000). http://citeseersii.nec.com/gupta99capacitv.html.
Johnson et al., *Dynamic Source Routing In Ad-Hoc Wireless Networks*, Mobile Computing (1996), Imielinski et al., Eds., Kluwer Academic Publishers, http://citeseer.nj.nec.com/johnson96dynamic.html.
Kodialam et al., *Characterizing Achievable Rates In Multi-Hop Wireless Networks: The Joint Routing And Scheduling Problem*, ACM MOBICOM (Sep. 2003).
Li et al., *Capacity Of Ad Hoc Wireless Networks*, ACM MOBICOM, (Jul. 2001). http://citeseer.nj.nec.com/li01capacity.html.
*Matlab version* 6.1. http://www.matlab.com/.
Nandagopal et al., *Achieving MAC Layer Fairness In Wireless Packet Networks*, ACM MOBICOM, (Aug. 2000). http://citeseer.nj.nec.com/nandagopal00achieving.html.
*The Network Simulator—ns*-2, (1995) http://www-mash.cs.berkeley.edu/ns/.
Park et at, *A Highly Adaptive Distributed Routing Algorithm For Mobile Wireless Networks*, Proc. Of IEEE Infocom'97, (Apr. 1997) http://citeseer.ni.nec.com/park97highly.html.
Perkins et al., *Highly Dynamic Destination-Sequenced Distance Vector Routing (DSDV) For Mobile Computers*, Proc. of ACM SIGCOMM'94, (Sep. 1994). http://citeseer.nj.nec.com/perkins94highly.html.
Perkins et al., *Ad-Hoc On-Demand Distance Vector Routing*, Proc. of IEEE WMCSA '99 (Feb. 1999). http://citeseer.nj.nec.com/549597.html.
*Seattle wireless*, http://www.seattlewireless.net/.
Yang, et al., *Priority Scheduling In Wireless Ad Hoc Networks*, In ACM MobiHoc, (Jun. 2002).

\* cited by examiner

MODEL AND METHOD FOR COMPUTING PERFORMANCE BOUNDS IN MULTI-HOP WIRELESS NETWORKS

RELATED APPLICATIONS

This application is a divisional of U.S. application Ser. No. 10/680,549, entitled "MODEL AND METHOD FOR COMPUTING PERFORMANCE BOUNDS IN MULTI-HOP WIRELESS NETWORKS," filed on Oct. 7, 2003, which is incorporated by reference in its entirety.

TECHNICAL FIELD

The present invention relates generally to computer networks and, more particularly, to computing performance bounds in multi-hop wireless networks.

BACKGROUND OF THE INVENTION

Multi-hop wireless networks have been the subject of much study over the past few decades. Much of the original work was motivated by military applications such as battlefield communications. More recently, however, some interesting commercial applications have emerged. One example is "community wireless networks", where a multi-hop wireless network, perhaps based on the IEEE 802.11 standard, is used to provide the "last-mile" to peoples' homes. A very different example is sensor networks where the scale and environment make a multi-hop wireless network the only feasible means of communication.

A fundamental issue in multi-hop wireless networks is that performance degrades sharply as the number of hops traversed increases. As a simple example, in a network comprising nodes with identical and omni-directional radio ranges, going from a single hop to two hops halves the throughput of a flow because wireless interference dictates that only one of the two hops can be active at a time.

The performance challenges of multi-hop networks have long been recognized and have led to much work on new and better solutions for the medium access control (MAC), routing, and transport layers of the protocol stack. However, in recent years, there has also been a focus on the fundamental question of what the capacity of a multi-hop wireless network is. The seminal paper by Gupta and Kumar (see Gupta, P., and Kumar, P. R., "The capacity of wireless networks," *IEEE Transactions on Information Theory* 46, 2 (March 2000)) showed that in a network comprising of n identical nodes, each of which is communicating with another node, the throughput capacity per node is $\Theta(1/\sqrt{n \log n})$ assuming random node placement and communication pattern and $\Theta(1/\sqrt{n})$ assuming optimal node placement and communication pattern. Subsequent work has considered alternative models and settings, such as the presence of relay nodes and mobile nodes, and locality in inter-node communication, and their results are less pessimistic.

SUMMARY OF THE INVENTION

In view of the foregoing, the present invention provides a model and method for computing the optimal throughput (i.e., the maximum aggregate throughput) of a wireless network. A construct called a conflict graph is introduced to model the effects of wireless interference. The conflict graph indicates which groups of links mutually interfere and hence cannot be active simultaneously. Using a multi-commodity flow problem (see Chavtal, V., *Linear Programming*, W.H. Freeman and Company, 1983), augmented with constraints derived from the conflict graph, the optimal throughput that the wireless network can support between given sources and sinks can be computed. However, this problem turns out to be NP-hard, so instead methods for computing upper and lower bounds on the optimal throughput are disclosed.

A distinction of the present invention from previous work is that the model and method work with any given wireless network configuration and workload specified as inputs. In other words, the node locations, ranges, etc. as well as the traffic matrix indicating which source nodes are communicating with which sink nodes are specified as the input. No assumptions are made about the homogeneity of nodes with regard to radio range or other characteristics, or regularity in communication pattern. In contrast, previous work has focused on asymptotic bounds under assumptions such as node homogeneity and random communication patterns.

The generality of the model and method is an additional advantage possessed by the present invention. This generality allows for accommodation of a diversity of wireless network characteristics such as the availability of multiple (non-overlapping) channels, multiple radios per node, and directional antennae. Furthermore, the model and method of the present invention can accommodate multiple MAC protocol models as well as single-path and multi-path routing constraints.

To compute bounds on the optimal throughput, an assumption is made that packet transmissions at the individual nodes can be finely controlled and carefully scheduled by an omniscient and omnipotent central entity. While this assumption may be unrealistic, it gives a best case bound against which to compare practical algorithms for routing, medium access control, and packet scheduling. More importantly from a practical viewpoint, simulations show that the routes derived from application of the model and method of the present invention often yield noticeably better throughput than the default shortest path routes, even in the presence of real-world effects such as uncoordinated packet transmissions and MAC contention. In some cases, the throughput gain is over a factor of 2. The reason for this improvement is that in optimizing throughput, the model and method of the present invention tend to find routes that are less prone to wireless interference. For instance, a longer route along the periphery of the network may be picked instead of a shorter but more interference prone route through the middle of the network.

Finally the model and method of the present invention can be employed to evaluate how the per-node throughput in a multi-hop wireless network varies as the number of nodes grows. Previous work suggests that the per-node throughput falls as the number of nodes grows. But this result is under the assumption that nodes always have data to send and are ready to transmit as fast as their wireless connection will allow. In a realistic setting, however, sources tend to send data at a steady rate—which may be lower than the link capacity—so nodes will on average transmit at a slower rate than the speed of their wireless link. In such a setting, the model and method of the present invention finds that the addition of new nodes can actually improve the per-node throughput because the richer connectivity (and hence increased opportunities for routing around interference "hotspots" in the network) more than offsets the increase in traffic load caused by the new node.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
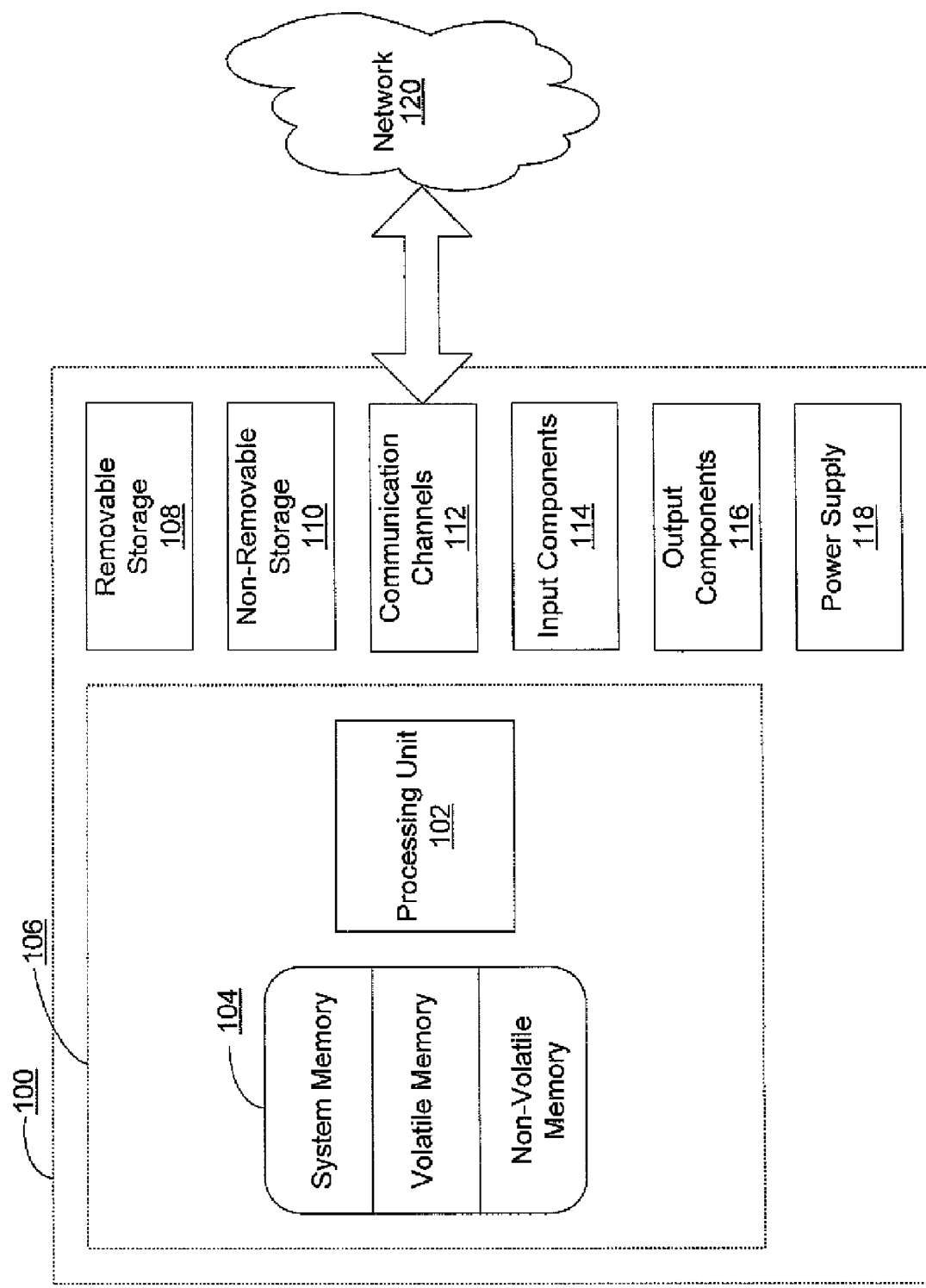
FIG. 1 is a schematic diagram of an exemplary computer architecture on which the model and method of the invention may be implemented.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

I. Exemplary Environment

Referring to FIG. 1, the present invention relates to communications between network nodes on connected computer networks. Each of the network nodes resides in a computer that may have one of many different computer architectures. For descriptive purposes, FIG. 1 shows a schematic diagram of an exemplary computer architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 1. The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing device 100 typically includes at least one processing unit 102 and memory 104. The memory 104 may be volatile (such as RAM), non-volatile (such as ROM and flash memory), or some combination of the two. This most basic configuration is illustrated in FIG. 1 by the dashed line 106.

Computing device 100 can also contain storage media devices 108 and 110 that may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing device.

Computing device 100 can also contain communication channels 112 that allow it to communicate with other devices. Communication channels 112 are examples of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media. The computing device 100 may also have input components 114 such as a keyboard, mouse, pen, a voice-input component, and a touch-input device. Output components 116 include screen displays, speakers, printers, and rendering modules (often called "adapters") for driving them. The computing device 100 has a power supply 118. All these components are well known in the art and need not be discussed at length here.

II. Model and Method for Computing Bounds on Optimal Throughput

The present invention is directed to a model for incorporating the constraints imposed by interference in a multi-hop wireless network and a method for computing bounds on the optimal throughput that a given network can support for a given traffic workload.

Figure 2:
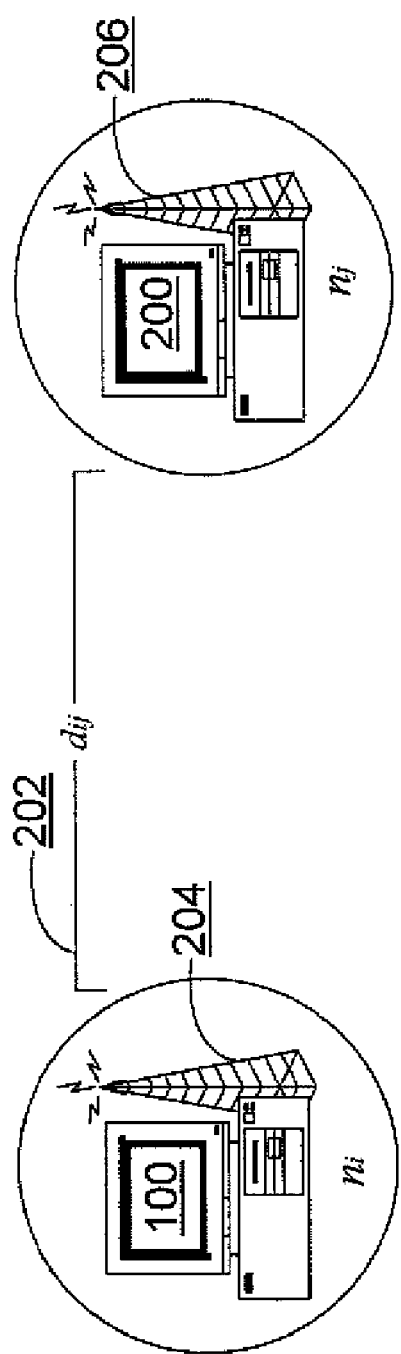
FIG. 2 is a schematic diagram of an exemplary wireless network architecture.

Referring to FIG. 2, consider a wireless network with N nodes 100, 200 arbitrarily located in space. Let $n_i$, $1 \leq i \leq N$ denote the nodes, and $d_{ij}$ 202 denote the distance between nodes $n_i$ 100 and $n_j$ 200. Each node, $n_i$ 100, is equipped with a radio 204, 206 with communication range $R_i$ and a potentially larger interference range. For ease of exposition, an assumption is made that there is a single wireless channel. Two models can be considered, the *Protocol Model* and the *Physical Model*, to define the conditions for a successful wireless transmission.

In the protocol model, if there is a single wireless channel, a transmission is successful if both of the following conditions are satisfied:

1) $d_{ij} \leq R_i$
2) Any node $n_k$, such that $d_{kj} \leq R'_k$, is not transmitting It should be noted that the second requirement implies that a node may not send and receive at the same time nor transmit to more than one other node at the same time. It should also be noted that this model differs from the popular IEEE 802.11 standard MAC in an important way—it requires only the receiver to be free of interference, instead of requiring that both the sender and the receiver be free of interference (a discussion on how to adapt the model for an 802.11-style MAC is found in Section D below).

Turning to the physical model, suppose node $n_i$ 100 wants to transmit to node $n_j$ 200. Let $SS_{ij}$ be the signal strength of $n_i$'s transmission as received at $n_j$. The transmission is successful if $SNR_{ij} \geq SNR_{thresh}$, where $SNR_{ij}$ denotes the ratio of $SS_{ij}$ to $N_j$. The total noise, $N_j$, at $n_j$ consists of the ambient noise, $N_a$, plus the interference due to other ongoing transmissions in the network. It should be noted that there is no requirement that the noise level at the sender also be low.

A goal of the present invention is to provide a framework to model wireless interference and a methodology for computing bounds on the optimal throughput, where the "optimal throughput" corresponds to the absolute best case where the packet transmissions at the individual nodes can be finely controlled and carefully scheduled by an omniscient and omnipotent central entity. Thus, issues such as MAC contention that may be unavoidable in a distributed network are not of concern (such real-world issues are considered in the simulation results presented in Section III). In the problem formulation here, the focus is on maximizing the total throughput between source-destination pairs assuming that the sources always have data to send and the destination nodes are always ready to accept data.

The communication between the sources and destinations can be either direct or be routed via intermediate nodes. It can be said that a network throughput D is feasible if there exists a schedule of transmissions such that no two interfering links are active simultaneously, and the total throughput for the given source-destination pairs is D.

The following three scenarios are now considered in detail: multi-path routing under the protocol interference model, multi-path routing under the physical interference model, and single-path routing under both models. Additionally, a discussion of several other generalizations of the framework follows.

A. Multi-Path Routing Under the Protocol Interference Model

Figure 3:
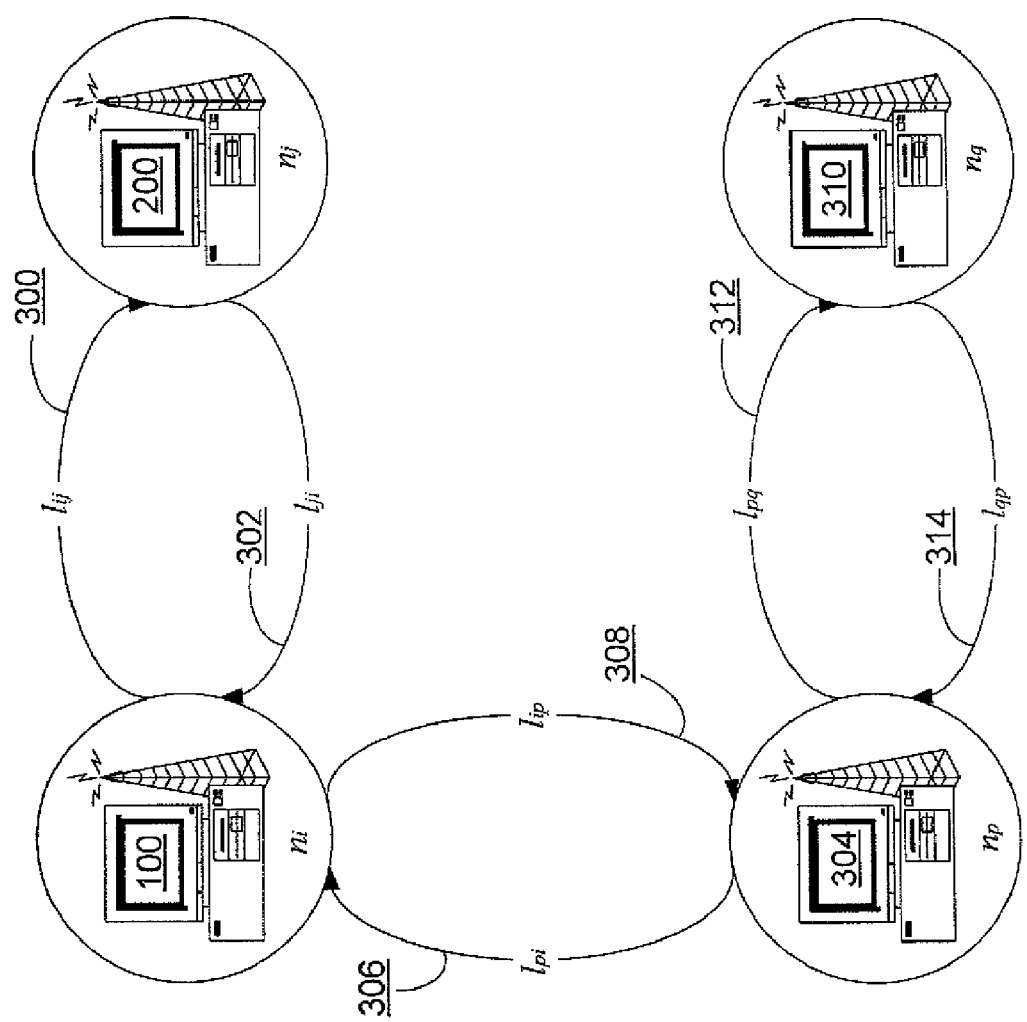
FIG. 3 is a connectivity graph of an exemplary wireless network architecture.

With reference to FIG. 3, given a wireless network with N nodes 100, 200, 304, 310 a connectivity graph C can first be derived as follows. The vertices of C correspond to the wireless nodes ($N_C$) 100, 200, 304, 310 and the edges 300, 302, 306, 308, 312, 314 correspond to the wireless links ($L_C$) between the nodes. There is a directed link $l_{ij}$ 300 from node $n_i$ 100 to $n_j$ 200 if $d_{ij} \leq R_i$ and $i \neq j$. Here the terms "node" and "link" are used in reference to the connectivity graph while the terms "vertex" and "edge" are reserved for the conflict graph presented below.

Consider first communication between a single source, $n_s$, and a single destination, $n_d$. In the absence of wireless interference (e.g., on a wired network), finding the maximum achievable flow between the source and the destination, given the flexibility of using multiple paths, can be formulated as a linear program corresponding to a max-flow problem:

$$\max \sum_{l_{si} \in L_C} f_{si}$$

subject to $$\sum_{l_{ij} \in L_C} f_{ij} = \sum_{l_{ji} \in L_C} f_{ji} \forall n_i \in N_C \setminus \{n_s, n_d\} \quad <1>$$

$$\sum_{l_{is} \in L_C} f_{is} = 0 \quad <2>$$

$$\sum_{l_{di} \in L_C} f_{di} = 0 \quad <3>$$

$$f_{ij} \leq Cap_{ij} \forall l_{ij} \in L_C \quad <4>$$

$$f_{ij} \geq 0 \forall l_{ij} \in L_C \quad <5>$$

Here, $f_{ij}$ denotes the amount of flow on link $l_{ij}$, $Cap_{ij}$ denotes the capacity of link $l_{ij}$, and $L_C$ is a set of all links in the connectivity graph.

The maximization states that it is the objective to maximize the sum of flow out of the source. The first constraint represents flow-conservation, i.e., at every node, except the source and the destination, the amount of incoming flow is equal to the amount of outgoing flow. The second constraint states that the incoming flow to the source node is 0. The third constraint states that the outgoing flow from the destination node is 0. The fourth constraint indicates the amount of flow on a link cannot exceed the capacity of the link. The final constraint restricts the amount of flow on each link to be non-negative. The above formulation does not take into account wireless interference, which may impose additional constraints on when the individual wireless links may be active. This issue is considered next.

Figure 4:
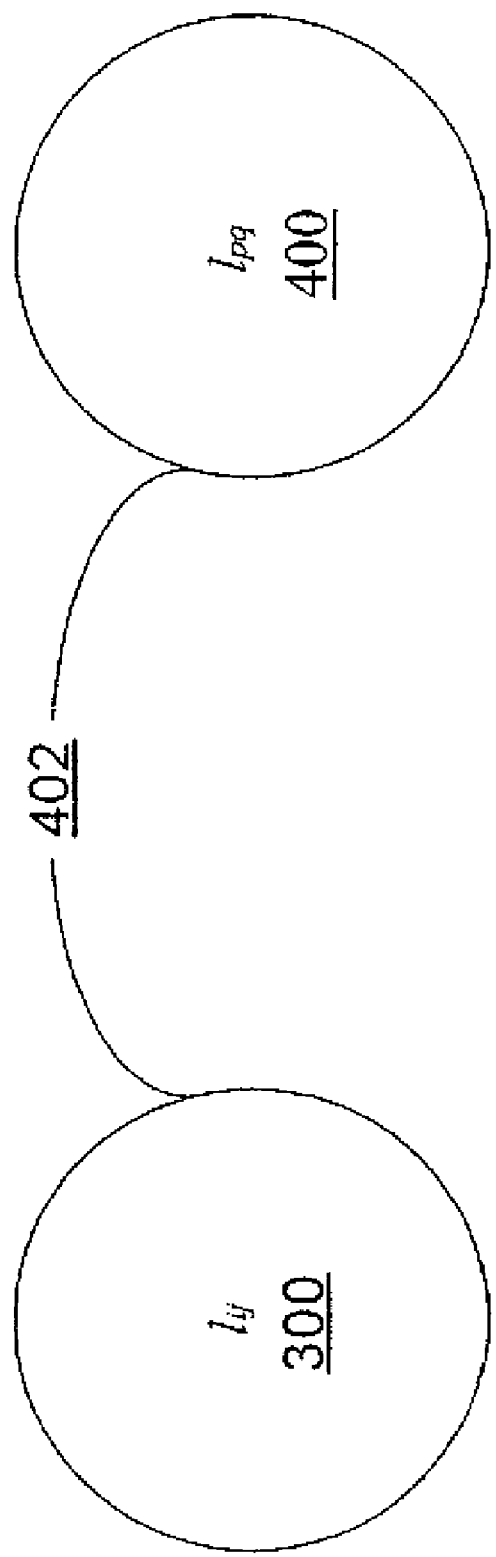
FIG. 4 is a conflict graph of an exemplary wireless network architecture.

Turning to FIG. 4, to incorporate wireless interference into the problem formulation, a conflict graph, F, is defined whose vertices 300, 400 correspond to the links in the connectivity graph, C. There is an edge 402 between the vertices $l_{ij}$ 300 and $l_{pq}$ 400 in F if the links $l_{ij}$ 300 and $l_{pq}$ 400 may not be active simultaneously. Based on the protocol interference model described above, such an edge 402 is drawn if any of the following is true: $d_{iq} \leq R'_i$ or $d_{pj} \leq R'_p$. This encompasses the case where a conflict arises because links $l_{ij}$ and $l_{pq}$ have a node in common (i.e., i=p or i=q or j=p or j=q). It should be noted however, that an edge from a vertex to itself is not drawn in the conflict graph.

Next, a hardness result for computing the optimal throughput under the protocol interference model is presented. Given a graph H (with vertex set $V_H$), an independent set is a set of vertices, such that there is no edge between any two of the vertices. The independence number of graph H is the size of the largest independent set in H. The following hardness result exists.

Theorem 1: Given a network and a set of source and destination nodes, it is NP-hard to find the optimal throughput under the protocol interference model. Moreover, it is NP-hard to approximate the optimal throughput.

It can be shown that the problem of finding the independence number of a graph (a known hard problem even to approximate) can be reduced to the optimal throughput problem. Moreover, this reduction is approximation preserving. Hence the above hardness result. A brief discussion of the reduction follows.

Suppose given a graph G, the computation of the cardinality of its maximum independent set is desired. A wireless network can be constructed such that the optimal throughput it can support under the protocol interference model is same as the cardinality of the maximum independent set of G. Two wireless nodes, a source s and a receiver r are created. For every vertex in G a wireless link of unit capacity between s and r is added. For every edge between two nodes in G, it is assumed that there is a conflict between the corresponding wireless links in the network (such a network may arise, for instance, if nodes s and r are each equipped with multiple radios set either to the same (i.e., interfering) channel or to separate (i.e., non-interfering) channels). As one of ordinary skill in the art will appreciate, it is not hard to see that the optimal throughput is achieved if and only if a maximum independent set in G is scheduled. Thus, finding the optimal capacity of the wireless network is equivalent to finding the cardinality of the maximum independent set of graph G, which is known to those of ordinary skill in the art to be a hard problem.

Since it is NP-hard to approximate the optimal throughput, heuristics for obtaining lower and upper bounds on the throughput should be considered. An independent set of a graph H can be characterized using an independence vector, which is a vector of size $|V_H|$. This vector is denoted by $x_I$, where I is an independent set. The $j^{th}$ element of this vector is set to 1 if and only if the vertex $v_j$ is a member of the independent set I, otherwise it is zero. $x_I$ can be thought of as a point in an $|V_H|$-dimensional space. The polytope defined by convex combination of independence vectors is called the independent setpolytope (also known as the stable setpolytope).

The problem of deriving a lower bound is equivalent to the problem of finding a network throughput D that has a feasible schedule to achieve it. The following observation can be made. Links belonging to a given independent set in conflict graph F can be scheduled simultaneously. Suppose there are a total of K maximal independent sets in graph F (a maximal independent set is one that cannot be grown further). Let $I_1$, $I_2$, ... $I_K$ denote these maximal independent sets, and $\lambda_i$, $0 \leq \lambda_i \leq 1$ denote the fraction of time allocated to the independent set $I_i$ (i.e., the time during which the links in $I_i$ can be active). If the schedule restrictions imposed by the independent sets are added to the above linear program, the resulting throughput always has a feasible schedule, and therefore constitutes a lower bound on the maximum achievable throughput.

The above observation can be formalized as follows. Given a conflict graph F, a usage vector, U, can be defined of size $|V_F|$, where $U_i$ denotes the fraction of time that the link i can be active. A usage vector is schedulable if the corresponding links can be scheduled, conflict free, for the fraction of the time indicated in the usage vector. If the usage vector is though of as a point in an $|V_F|$-dimensional space, the following theorem exists:

Theorem 2: A usage vector is schedulable if and only if it lies within the independent set polytope of the conflict graph.

Theorem 2 implies that the optimal network throughput problem is a linear program, no matter how many sender-receiver pairs there are. In fact, the problem is one of maximizing a linear objective function over a feasible polytope. This feasible polytope can be described as the intersection of two polytopes—the flow polytope and the independent set polytope of the conflict graph. The flow polytope is the collection of feasible points described by the flow constraints, ignoring wireless conflicts. The flow polytope is a simple structure on which a linear objective function can easily be optimized. The independent set polytope, on the other hand, is a difficult structure and no characterization of it is known (because there may be exponentially many independent sets).

Theorem 2 implies that any convex combination of independence vectors is schedulable. In general, however, an arbitrary point inside the independent set polytope will be a convex combination of an exponentially many independence vectors. To get around this computational problem, it is desired to only pick "easy" points in the independent set polytope. An obvious notion of "easy" is that the point picked should be a convex combination of a small number of (i.e., polynomially many) independence vectors. This notion is used explicitly in the algorithm as follows. A lower bound on the optimal throughput is derived by finding K' independence vectors in the conflict graph F, and adding the following constraints to the linear program formulation shown above:

$$\sum_{i=1}^{K'} \lambda_i \leq 1$$

(because only one maximal independent set can be active at a time)

$f_{ij} \leq \Sigma_{I:ij \in I} \lambda_i Cap_{ij}$ (because the fraction of time for which a link may be active is constrained by the sum of the activity periods of the independent sets it is a member of)

It should be noted that the solution produced by solving this linear program is always feasible (i.e., schedulable). This is due to the fact that all links belonging to independent set $I_i$ can be simultaneously active for $\lambda_i$ fraction of time, and it has been required that the $$\sum_{i=1}^{K'} \lambda_i \leq 1.$$

Moreover, theorem 2 assures that when all independent sets are included, the solution will be exact, i.e., this will be the maximum value of D that is feasible. To help tighten the lower bound more quickly, using maximal independence sets should be considered. While finding all maximal independent sets is also NP-complete (see Garey, M. R. and Johnson, D. S., *Computers and Intractability: A guide to the theory of NP completeness*, W.H. Freeman and Company, 1979), the lower bound obtained by considering a subset of the (maximal) independent sets has the desirable property that as more constraints are added, the bound becomes tighter, eventually converging to the optimal (i.e., the maximum feasible bound) when all the constraints are added.

Next an upper bound on the network throughput can be derived. Consider the conflict graph. A clique in the conflict graph is a set of vertices that mutually conflict with each other. Theorem 2 implies that the total usage of the links in a clique is at most 1. This gives a constraint on the usage vector. Many cliques can be found and corresponding constraints to define a polytope can be written. The throughput can then be maximized over the intersection of this polytope with flow polytope. This will give an upper bound on the throughput.

Figure 5:
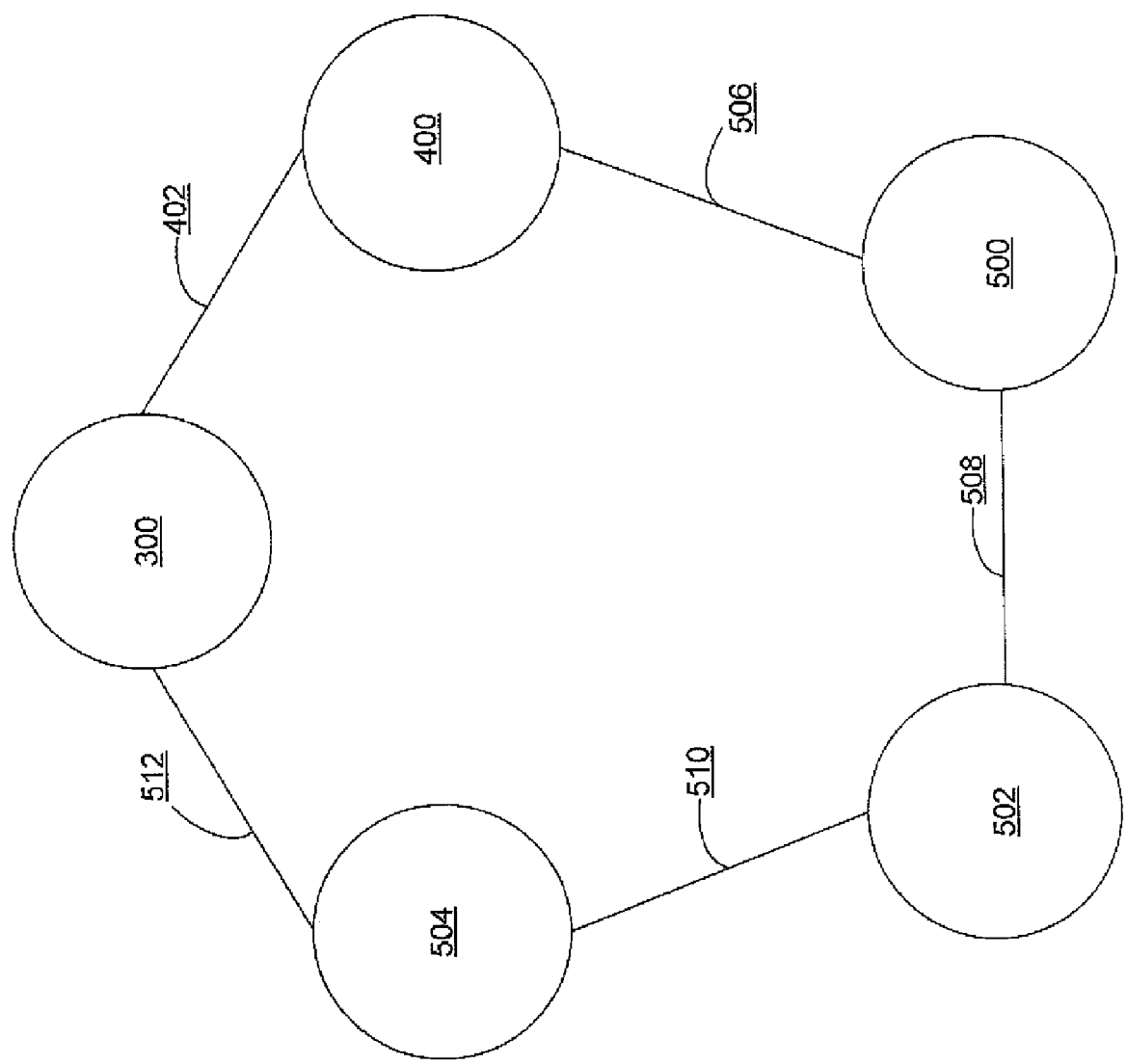
FIG. 5 is a conflict graph of an exemplary wireless network architecture.
Figure 6:
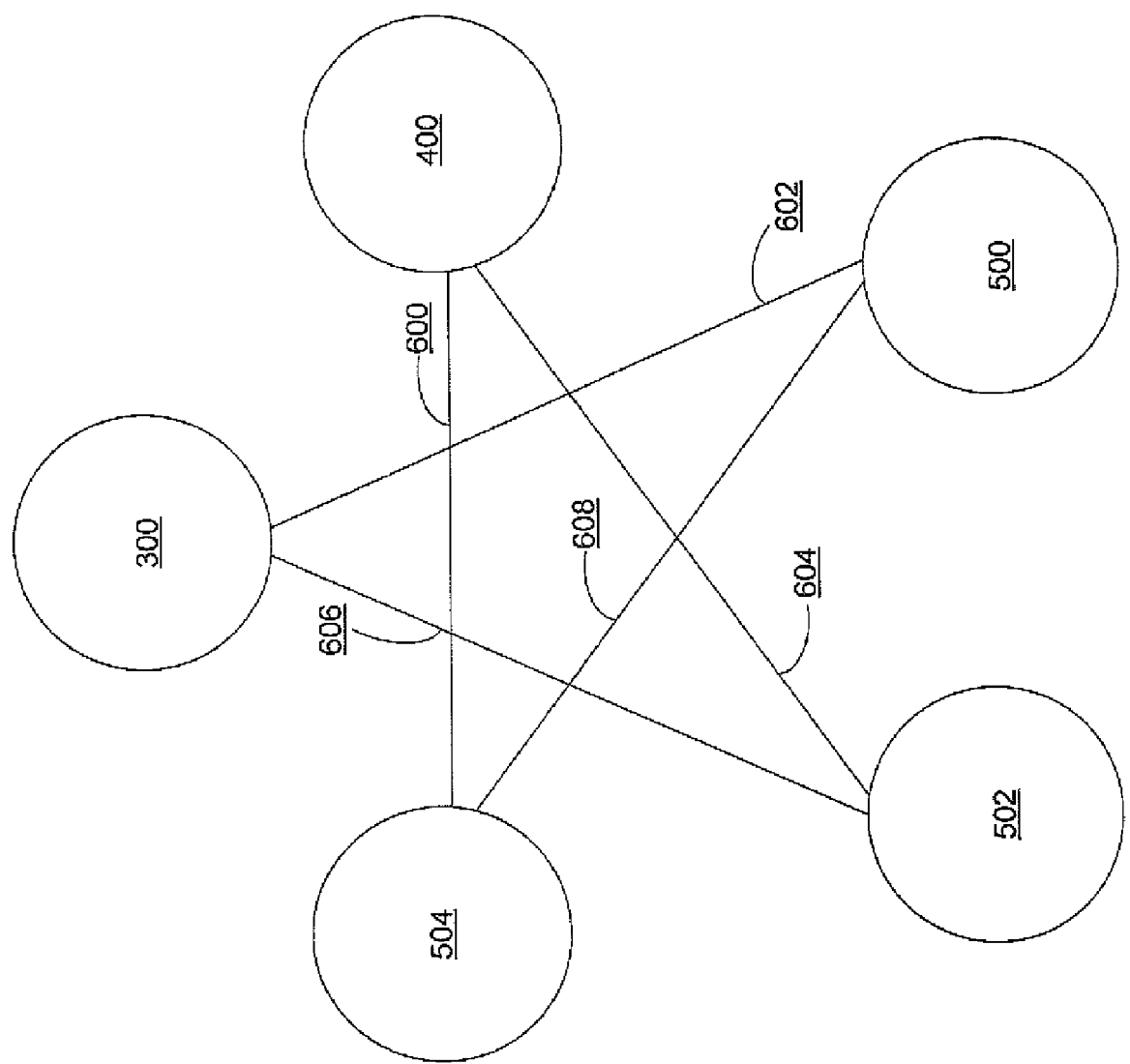
FIG. 6 is a conflict graph of an exemplary wireless network architecture.

Unfortunately, it is computationally expensive to find all the cliques, and even if it were possible to find them all, there is still no guarantee that the upper bound will be tight. This can be illustrated by the following example. Suppose the conflict graph is the pentagon depicted in FIG. 5. As can be seen, the only cliques in the graph are formed by the adjacent pairs of nodes. Adding the clique constraints alone to the linear program would suggest that a sum of link utilization equal to 2.5 is achievable. But actually at most 2 links can be active at a time. This suggests that adding constraints corresponding to odd holes and odd anti-holes is necessary. An odd hole is a circle (i.e., loop) formed by an odd number of edges, without a chord in between (the pentagon in FIG. 5 is an odd hole). The sum of the link utilization in an odd hole containing k vertices can be no more than $\lfloor k/2 \rfloor$. An odd anti-hole is the complementary graph of an odd hole. FIG. 6 shows an example of an anti-hole with 5 nodes. The sum of link utilizations in an odd anti-hole can be no more than 2.

Figure 7:
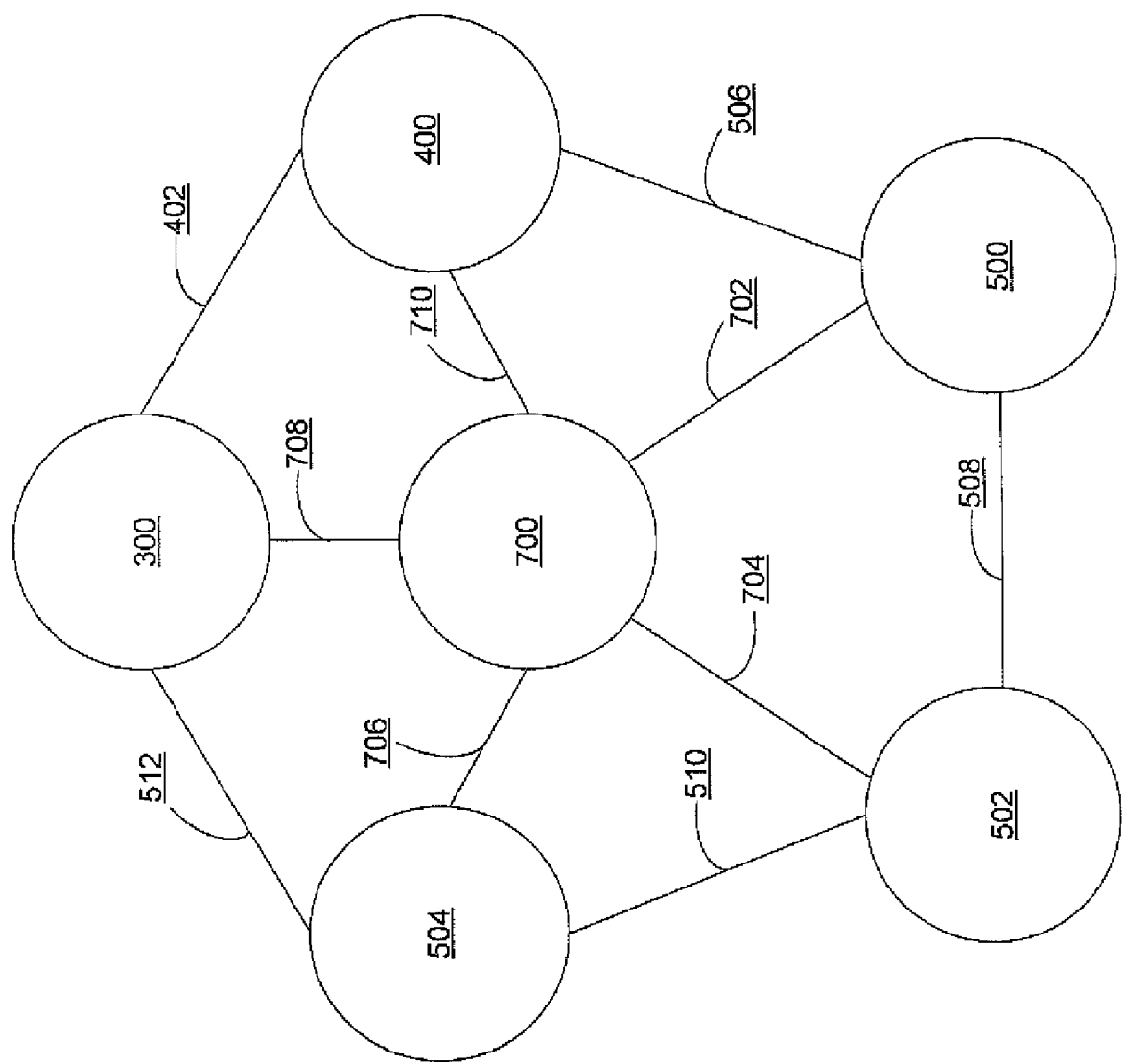
FIG. 7 is a conflict graph of an exemplary wireless network architecture.

Even if the constraints imposed by the odd holes and odd anti-holes are considered (in addition to those imposed by the cliques), there is still no guarantee to have a feasible solution. For example, consider the conflict graph, as shown in FIG. 7. A utilization of 0.4 can be assigned to all the vertices 300, 400, 500, 502, 504 on the pentagon and 0.2 to the center of the pentagon 700, while satisfying all clique, hole, and anti-hole constraints. But there is no feasible schedule to achieve this, because this solution does not lie in the stable-set polytope. In fact, the upper bound based only on clique constraints is tight only for a special class of conflict graphs called perfect graphs. Perfect graphs are the graphs without any odd holes or odd anti-holes. Thus, in the present formulation, the upper bounds may not always be tight.

B. Multi-Path Routing Under the Physical Interference Model

As above, the process of computing the throughput in the physical interference model begins with creating a connectivity graph C, whose vertices correspond to the nodes in the network. Based on the physical interference model, there exists a link, $l_{ij}$, from $n_i$ to $n_j$ if and only if $SS_{ij}/N_a \geq SNR_{thresh}$ (i.e., the SNR exceeds the threshold at least in the presence of just the ambient noise).

Using the connectivity graph, a linear program formulation can be written to optimize network throughput for a wired network. As discussed above, the solution to the linear program, provides an upper bound on network throughput. However, this bound is not very useful since it does not take interference effects into account.

To take interference effects into account, a conflict graph F is constructed. Unlike in the protocol model, conflicts in the physical model are not binary. Rather, the interference gradually increases as more neighboring nodes transmit, and becomes intolerable when the noise level reaches a threshold. This gradual increase in interference suggests that there should be a weighted conflict graph, where the weight of a directed edge from vertices $l_{pq}$ to vertices $l_{ij}$ (denoted by $w_{ij}^{pq}$) indicates what fraction of the maximum permissible noise at node $n_j$ (for link $l_{ij}$ to still be operational) is contributed by activity on link $l_{pq}$ (i.e., node $n_p$'s transmission to node $n_q$). Specifically stated:

$$w_{ij}^{pq} = \frac{SS_{pj}}{\frac{SS_{ij}}{SNR_{thresh}} - N_a}$$

where $SS_{pj}$ and $SS_{ij}$ denote the signal strength at node $n_j$ of transmissions from nodes p and i, respectively, and $(SS_{ij}/SNR_{thresh})-N_a$ is the maximum permissible interference noise at node $n_j$ that would still allow successful reception of node $n_i$'s transmissions. The edges of the conflict graph are directed, and in general $w_{ij}^{pq}$ may not be equal to $w_{pq}^{ij}$.

In the protocol model, a lower bound on the network throughput is derived by finding independent sets in the conflict graph F, and adding the constraints associated with the independent sets to the linear program for the wired network. Analogous to independent sets, the notion of schedulable sets is introduced in the physical model. A schedulable set $H_x$ is defined as a set of vertices such that for every vertex $l_{ij} \in H_x$, $\Sigma_{l_{pq} \in H_x} w_{ij}^{pq} \leq 1$. It follows that all links in a schedulable set can be active simultaneously. Suppose the links belonging to $H_x$ are scheduled for time $\lambda_x$, $0 \leq \lambda_x \leq 1$. Now the following constraints are added to the original linear program for the wired network:

$$\sum_{x=1}^{K'} \lambda_x \leq 1,$$

where K' is the number if schedulable sets found $f_{ij} \leq \Sigma_{l_{ij} \in H_x} \lambda_x Cap_{ij}$ To tighten the bound, using maximal schedulable sets in graph F should be considered (i.e., a schedulable set such that adding additional vertices to the set will violate the schedulable property). The following theorem, which is similar to the Theorem 2 in the protocol model, exists:

Theorem 3: A usage vector is schedulable if and only if it lies in the schedulable set polytope of the conflict graph.

An upper bound is derived by considering maximal sets of vertices in F such that for any pair of vertices $l_{pq}$ and $l_{ij}$, $w_{ij}^{pq} \leq 1$. These correspond to the cliques in the protocol interference model. Therefore for each such set, a constraint that the sum of their utilization has to be no more than 1 is added.

These constraints may result in a loose bound since there may not be very many cliques. To tighten the upper bound, the linear program is further augmented with the following additional constraints. After a maximal schedulable set is found, say vertices $v_1, v_2, \ldots, v_t$, adding any additional vertex, denoted as $v_a$, to the set will make the set unschedulable. Therefore the following constraint exists: $U_1 + U_2 + \ldots U_t + U_a \leq t$, where as before $U_t$ denotes the fraction of time for which physical link $l_i$ (corresponding to vertex $v_i$ in the conflict graph) is active. By adding as many such constraints as possible, the upper bound can be tightened. Still, the bound is not guaranteed to converge to the optimal even if all such sets are included.

C. Single-Path Routing

So far multi-path routing has been considered. As many existing routing algorithms are confined to single-path routing, it is useful to derive a throughput bound for single-path yielding a comparison of how much the current protocols deviate from the theoretical achievable throughput under the same routing restriction. The single-path restriction for the flow from a source to a destination is enforced by adding the following additional constraints to the linear program problem for the wired network:

For each link $l_{ij}$, $f_{ij} \leq Cap_{ij} \cdot z_{ij}$, where $z_{i,j} \in \{0, 1\}$
At each node $n_i$, $\Sigma z_{ij} \leq 1$ Here $z_{ij}$ is a 0-1 variable that indicates whether or not link $l_{ij}$ is used for transmissions, and $f_{ij}$ is the amount of flow on the link. The basic intuition for these constraints is that in a single-path routing, at any node in the network, there is at most one out-going edge that has a non-zero flow. The first and the third condition ensure that at node $n_i$ at most one $z_{ij}$ will have a value of 1.

In theory, solving integer linear program is a NP-hard, but in practice, programs such as lp_solve (see Berkelaar, M., lp_solve: linear programming code, ftp://ftp.ics.ele.tue.nl/pub/lp_solve/) and CPLEX (see Ilog cplex suite, 2003, http://www.ilog.com/products/oplex/) can solve mixed-integer problems.

D. Other Generalizations

The basic conflict graph model is quite flexible, and can be generalized in many ways.

The formulations in the previous sections can be extended from a single source-destination pair to multiple source-destination pairs using a multi-commodity flow formulation augmented with constraints derived from the conflict graph. A connection identifier is assigned to each source-destination pair. Instead of the flow variables $f_{ij}$, the variable $f_{ijk}$ is introduced to denote the amount of flow for connection k on link $l_{ij}$. Referring to the linear program, the flow conservation constraints at each node apply on a per-connection basis (constraint <1>); the total incoming flow into a source node is zero only for the connection(s) originating at that node (constraint <2>); likewise, the total outgoing flow from a sink node is zero only for the connection(s) terminating at that node (constraint <3>); and the capacity constraints apply to the sum of the flow levels of all connections traversing a link (constraint <4>). This generalization is applicable to all variants of the problem.

It may be the case that instead of just one channel, each node can tune to one of M channels, $M \geq 1$. This can be easily modeled by introducing M links between nodes i and j, instead of just 1. In general, links corresponding to different channels do not conflict with each other, reflecting the fact that the channels do not mutually interfere. However, the links emanating from the same node do conflict, reflecting the constraint that the single radio at each node can transmit only on one channel at a time. This generalization is applicable to all variants of the problem.

Each wireless node may be equipped with more than one radio. If each node has M radios, this can be modeled by introducing M links between each pair of nodes. If it is assumed that each of these radios is tuned to a separate channel, and that a node can communicate on multiple radios simultaneously, then the conflict graph will show no conflict among the M links between a pair of nodes. This generalization is applicable to all variants of the problem.

The use of directional antennas can be combined with the basic protocol model of communication. Instead of specifying a range for each node, a list of nodes (or points in space) is simply specified where transmissions or interference from this node can be perceived. The connectivity graph and the conflict graph are modified to take this into account. This generalization is applicable to all variants of the problem.

In the simple example, an optimistic model of interference that did not require the sender to be free of interference was considered. But a more realistic model, which more closely reflects the situation in the IEEE 802.11 standard, would require both the sender and the receiver to be free of interference. This reflects the fact that the IEEE 802.11 standard may perform virtual carrier sensing using an RTS-CTS exchange, and that for successful communication, the sender must be able to hear the link layer acknowledgment transmitted by the receiver. Therefore, an edge in the conflict graph is drawn between vertices $l_{ij}$ and $l_{pq}$ if $d_{ab} \leq R'_a$ for ab=iq, qi, ip, pi, jp, pj, jq, or qi. This generalization is applicable to all variants of the problem.

The conflict graph model of the present invention focuses on maximizing the total throughput between source-destination pairs assuming that the sources always have data to send and the destination nodes are always ready to accept data. This framework carries over easily to other objective functions such as where one tries to maximize revenue, or maximize the minimum throughput across all source-destination pairs and thereby achieve a degree of fairness. Moreover, this framework can also accommodate the case where the rate at which nodes generate data or are willing to accept data is bounded simply by creating a virtual source or sink node and connecting it to the real source or sink via a virtual link of speed equal to the source or sink rate. The virtual link is special in that it is assumed not to interfere with any other link in the network. The virtual link is merely a convenient construct to help model the bound on the source or sink rate.

In addition to the fact that each of the above generalizations is applicable to all variants of the problem, the above generalizations can also be applied in combination with each other to all variants of the problem as well.

III. Applications of Model and Method for Computing Bounds on Optimal Throughput The capabilities of the model of the present invention can be demonstrated by several illustrative results.

A. Illustrative Results

Figure 8:
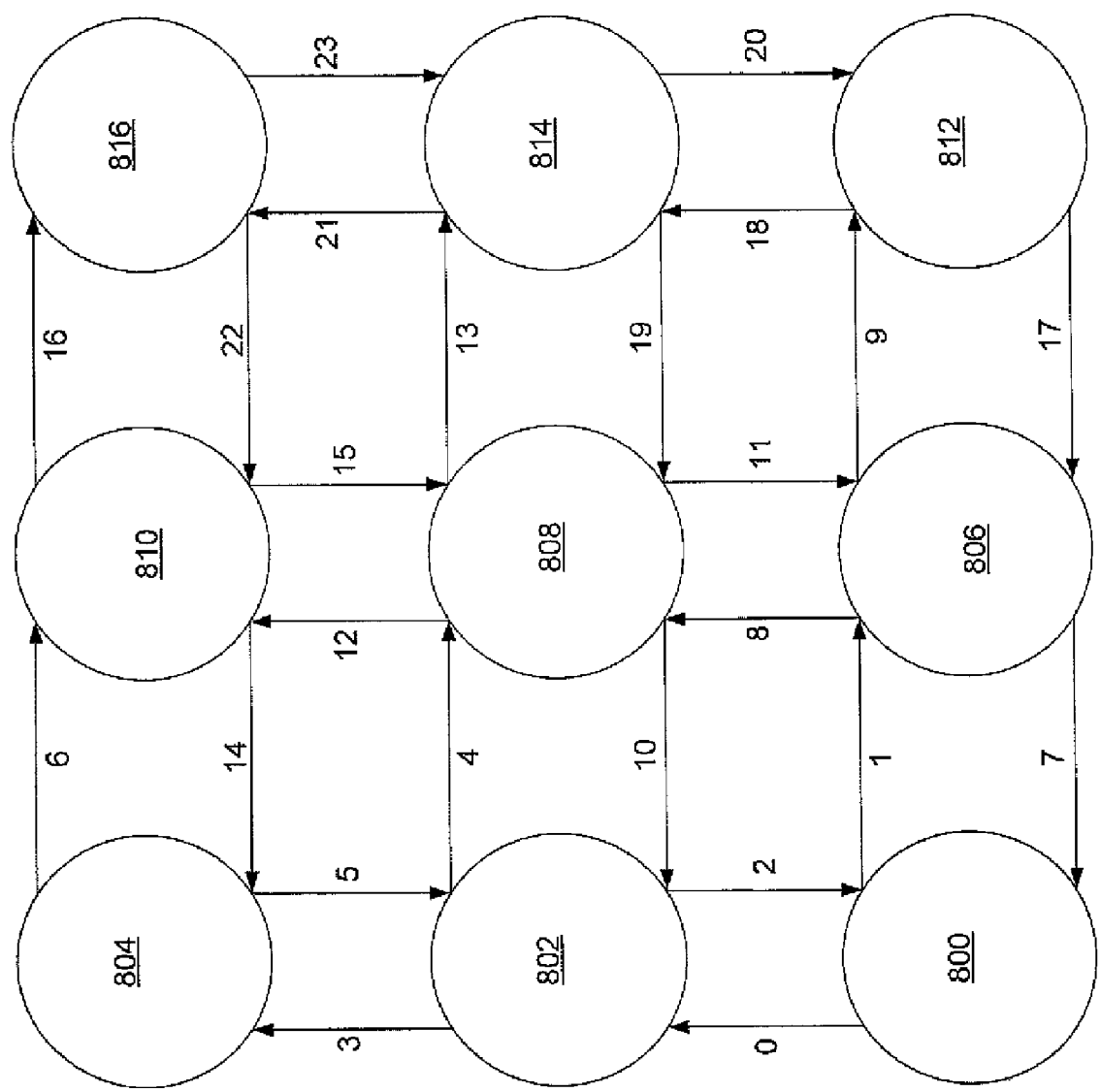
FIG. 8 is a connectivity graph of an exemplary wireless network architecture.

Turning to the network topology shown in FIG. 8. The network consists of 9 nodes 800, 802, 804, 806, 808, 810, 812, 814, 816, placed in a 3×3 grid. This topology is not claimed as being representative of typical wireless networks. A small, simple topology, has been deliberately chosen to facilitate detailed discussion of the results.

Several simplifying assumptions are first stated. These assumptions are relaxed as this section proceeds. The range of each node is assumed to be one unit, i.e., just enough to reach its lateral neighbors, but not the diagonal ones. Also it is assumed that the interference range is equal to the communication range. An 802.11-like protocol model of interference is assumed as described in Section II. This model requires both the sender and the receiver to be free of interference for successful communication. This is termed a bidirectional MAC. The resulting conflict graph for this scenario is shown below in the matrix form in Table 1. A 0 indicates that the links are not in conflict with each other, while 1 indicates otherwise. For example, when node 800 is transmitting to node 806, node 802 can hear these transmissions, and hence cannot transmit to node 804. Thus, links 1 (800→806) and 3 (802→804) are in conflict.

TABLE 1

Conflict Graph in Matrix Form

| link | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 0 | 0 | 1 | 1 | 1 | 1 | 1 | 1 | 1 | 1 | 1 | 1 | 1 | 1 | 1 | 1 | 1 | 0 | 1 | 0 | 1 | 0 | 0 | 0 | 0 |
| 1 | 1 | 0 | 1 | 1 | 1 | 1 | 0 | 1 | 1 | 1 | 1 | 1 | 1 | 1 | 0 | 1 | 0 | 1 | 1 | 1 | 1 | 0 | 0 | 0 |
| 2 | 1 | 1 | 0 | 1 | 1 | 1 | 1 | 1 | 1 | 1 | 1 | 1 | 1 | 1 | 1 | 1 | 0 | 1 | 0 | 1 | 0 | 0 | 0 | 0 |
| 3 | 1 | 1 | 1 | 0 | 1 | 1 | 1 | 1 | 1 | 0 | 1 | 1 | 1 | 1 | 1 | 1 | 1 | 0 | 0 | 1 | 0 | 0 | 0 | 1 |
| 4 | 1 | 1 | 1 | 1 | 0 | 1 | 1 | 1 | 1 | 1 | 1 | 1 | 1 | 1 | 1 | 1 | 1 | 1 | 1 | 1 | 1 | 1 | 1 | 1 |
| 5 | 1 | 1 | 1 | 1 | 1 | 0 | 1 | 1 | 1 | 0 | 1 | 1 | 1 | 1 | 1 | 1 | 0 | 0 | 1 | 0 | 0 | 1 | 1 | 0 |
| 6 | 1 | 0 | 1 | 1 | 1 | 1 | 0 | 0 | 1 | 0 | 1 | 1 | 1 | 1 | 1 | 1 | 0 | 0 | 1 | 0 | 1 | 1 | 1 | 1 |
| 7 | 1 | 1 | 1 | 1 | 1 | 1 | 0 | 0 | 1 | 1 | 1 | 1 | 1 | 0 | 1 | 0 | 1 | 1 | 1 | 1 | 0 | 0 | 0 | 0 |
| 8 | 1 | 1 | 1 | 1 | 1 | 1 | 1 | 1 | 0 | 1 | 1 | 1 | 1 | 1 | 1 | 1 | 1 | 1 | 1 | 1 | 1 | 1 | 1 | 1 |
| 9 | 1 | 1 | 1 | 0 | 1 | 0 | 0 | 1 | 1 | 0 | 1 | 1 | 1 | 0 | 1 | 0 | 1 | 1 | 1 | 1 | 1 | 0 | 0 | 1 |
| 10 | 1 | 1 | 1 | 1 | 1 | 1 | 1 | 1 | 1 | 1 | 0 | 1 | 1 | 1 | 1 | 1 | 1 | 1 | 1 | 1 | 1 | 1 | 1 | 1 |
| 11 | 1 | 1 | 1 | 1 | 1 | 1 | 1 | 1 | 1 | 1 | 1 | 0 | 1 | 1 | 1 | 1 | 1 | 1 | 1 | 1 | 1 | 1 | 1 | 1 |
| 12 | 1 | 1 | 1 | 1 | 1 | 1 | 1 | 1 | 1 | 1 | 1 | 1 | 0 | 1 | 1 | 1 | 1 | 1 | 1 | 1 | 1 | 1 | 1 | 1 |
| 13 | 1 | 1 | 1 | 1 | 1 | 1 | 1 | 1 | 1 | 1 | 1 | 1 | 0 | 1 | 1 | 1 | 1 | 1 | 1 | 1 | 1 | 1 | 1 | 1 |
| 14 | 1 | 0 | 1 | 1 | 1 | 1 | 1 | 0 | 1 | 0 | 1 | 1 | 1 | 0 | 1 | 1 | 0 | 0 | 1 | 0 | 1 | 1 | 1 | 1 |
| 15 | 1 | 1 | 1 | 1 | 1 | 1 | 1 | 1 | 1 | 1 | 1 | 1 | 1 | 1 | 0 | 1 | 1 | 1 | 1 | 1 | 1 | 1 | 1 | 1 |
| 16 | 0 | 0 | 0 | 1 | 1 | 1 | 1 | 0 | 1 | 0 | 1 | 1 | 1 | 1 | 1 | 1 | 0 | 0 | 1 | 1 | 1 | 1 | 1 | 1 |
| 17 | 1 | 1 | 1 | 0 | 1 | 0 | 0 | 1 | 1 | 1 | 1 | 1 | 1 | 0 | 1 | 0 | 0 | 1 | 1 | 1 | 1 | 1 | 0 | 1 |
| 18 | 0 | 1 | 0 | 0 | 1 | 0 | 0 | 1 | 1 | 1 | 1 | 1 | 1 | 1 | 0 | 1 | 1 | 1 | 0 | 1 | 1 | 1 | 1 | 1 |
| 19 | 1 | 1 | 1 | 1 | 1 | 1 | 1 | 1 | 1 | 1 | 1 | 1 | 1 | 1 | 1 | 1 | 1 | 1 | 0 | 1 | 1 | 1 | 1 | 1 |
| 20 | 0 | 1 | 0 | 0 | 1 | 0 | 0 | 1 | 1 | 1 | 1 | 1 | 1 | 1 | 0 | 1 | 1 | 1 | 1 | 1 | 0 | 1 | 1 | 1 |
| 21 | 0 | 0 | 0 | 0 | 1 | 0 | 1 | 0 | 1 | 1 | 1 | 1 | 1 | 1 | 1 | 1 | 1 | 1 | 1 | 1 | 0 | 1 | 1 | 1 |
| 22 | 0 | 0 | 0 | 1 | 1 | 1 | 1 | 0 | 1 | 0 | 1 | 1 | 1 | 1 | 1 | 1 | 0 | 1 | 1 | 1 | 1 | 0 | 1 | 1 |
| 23 | 0 | 0 | 0 | 0 | 1 | 0 | 1 | 0 | 1 | 1 | 1 | 1 | 1 | 1 | 1 | 1 | 1 | 1 | 1 | 1 | 1 | 1 | 1 | 0 |

Multi-path routing is allowed. It is assumed that all wireless links have an identical capacity (i.e., speed) of 1 unit and that all nodes have infinite buffers. Node 800 is designated to be the sender, and node 816 to be the receiver. The sender always has data to send, and the receiver is always willing to consume the data.

In this scenario, it is easy to see that the optimal throughput is 0.5. A convenient way to visualize the optimal transmission schedule is to imagine that time is divided into slots of equal size, and in each slot one packet can be transmitted between neighboring nodes, subject to constraints imposed by the conflict graph. Then, the following transmission schedule will achieve optimal throughput: (i) 800→802 (ii) 802→804 (iii) 800→806 and 804→810 (iv) 806→812 and 810→816 (v) 800→802 and 812→814 (vi) . . . . This schedule can continue in this manner indefinitely. It is easy to see that in alternate timeslots, node 800 gets to transmit to either node 802 or 806. Hence the optimal throughput is 0.5.

Figure 9:
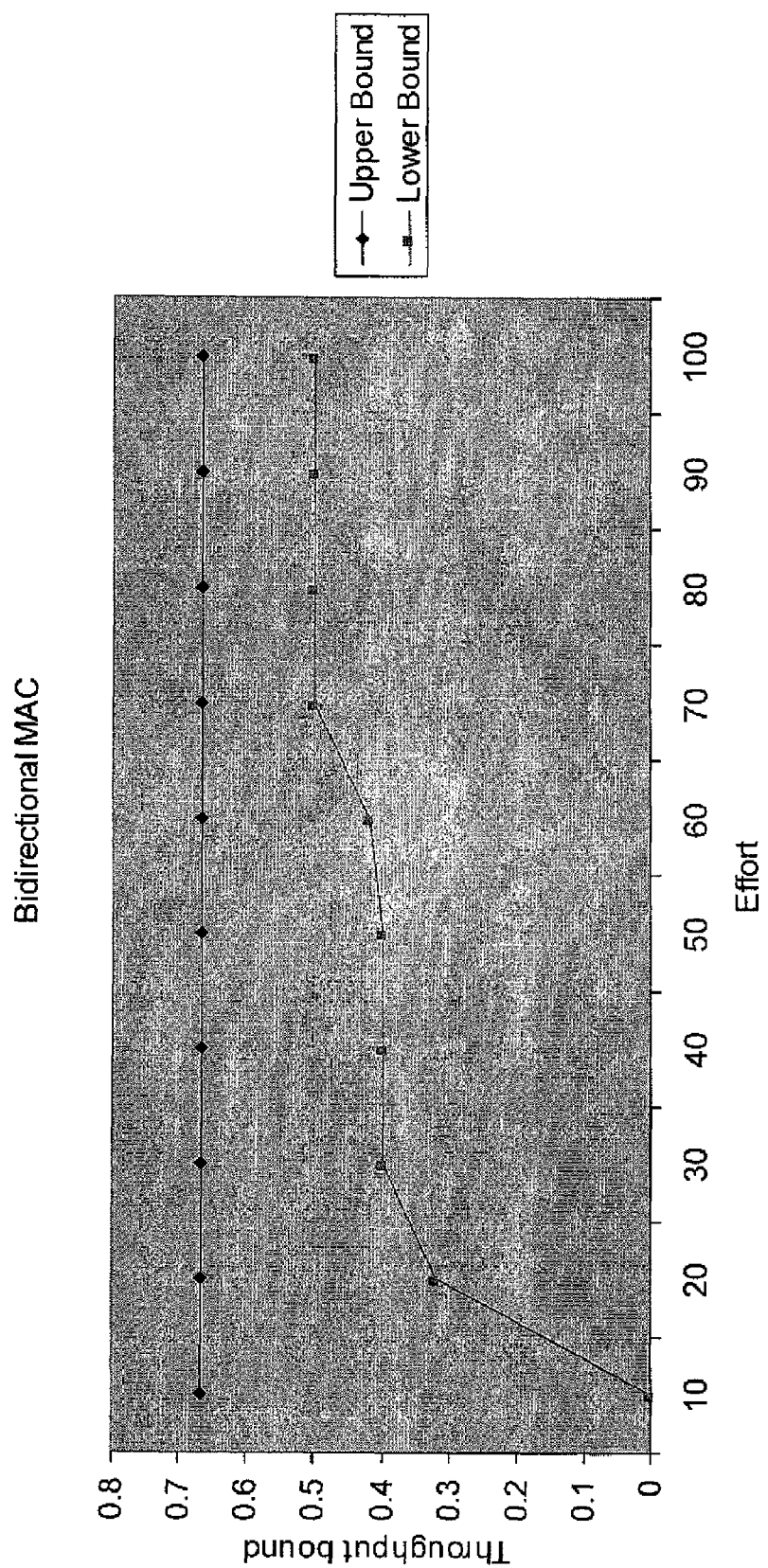
FIG. 9 is a graph plotting throughput bound against effort.

FIG. 9 shows the upper and lower bound on throughput calculated by the model, as an increasing amount of effort is devoted (for a discussion of effort see section E below). As shown, the upper bound quickly converges to the stable value of 0.667, which is somewhat higher than the optimal value. This is a clear indication of the fact that clique constraints alone are not sufficient to guarantee optimality, even in such small graphs (as noted in Section II). The lower bound, on the other hand, steadily converges to the optimal value of 0.5. It has been verified that the program has discovered all independent sets and cliques with 100 units of efforts.

Figure 10:
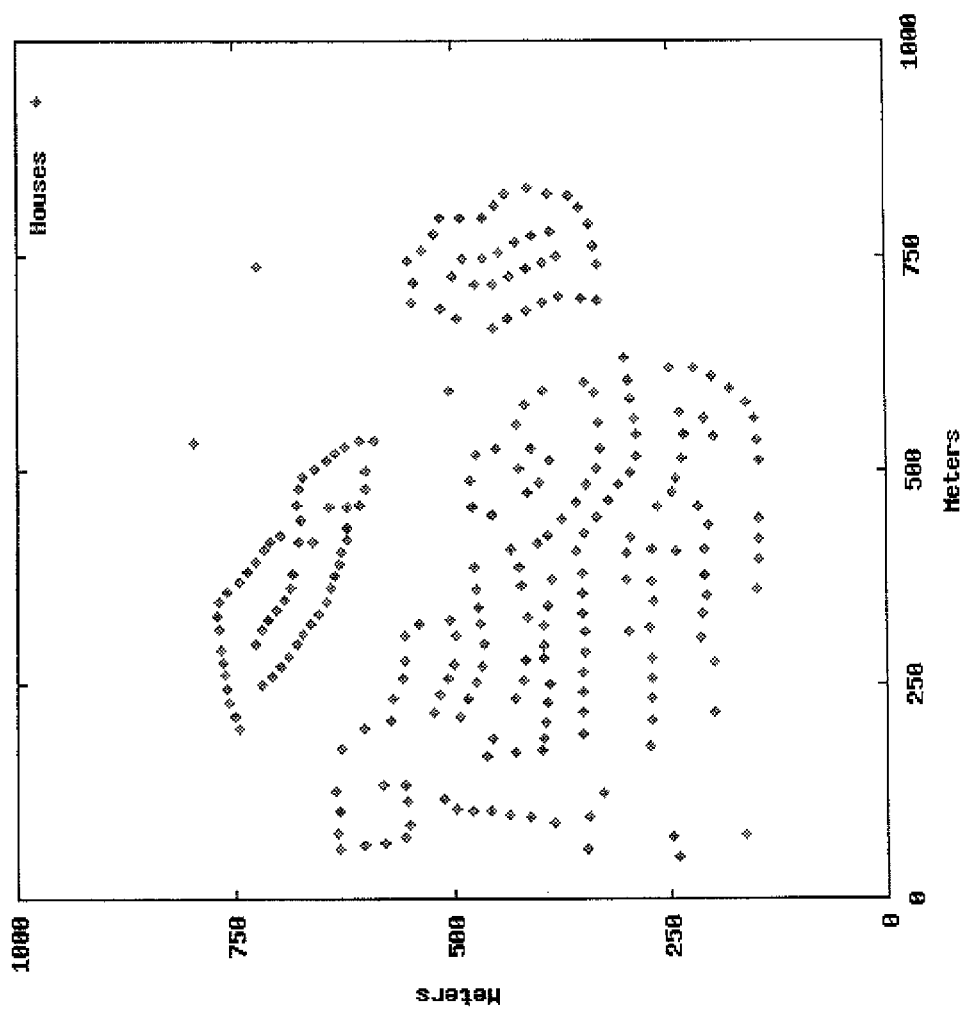
FIG. 10 is a map of an exemplary suburban neighborhood.
Figure 11:
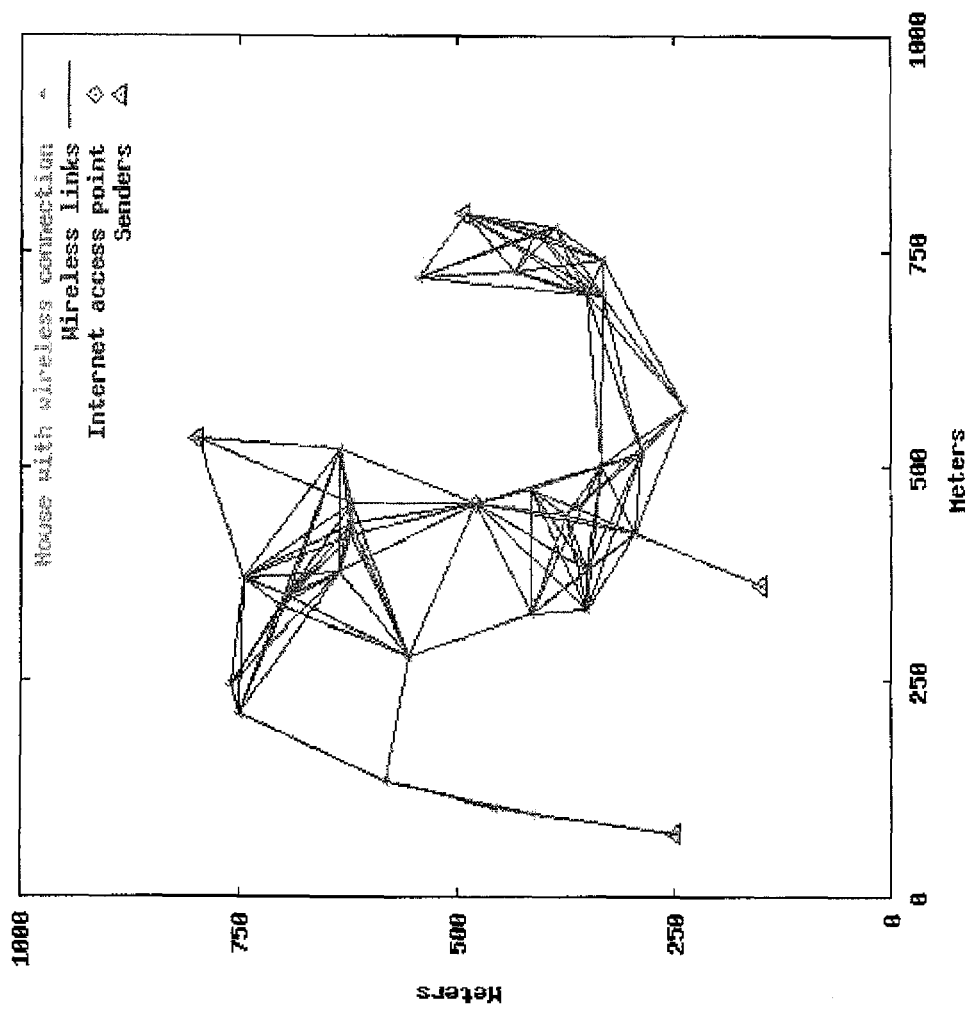
FIG. 11 is a connectivity graph of an exemplary suburban neighborhood.

The model of the present invention can also incorporate single path routing, multiple source-destination pairs, multiple channels as well as multiple radios. This flexibility is demonstrated with a community mesh networking scenario, in which multiple users share an Internet connection, using a multi-hop wireless network. Consider the suburban neighborhood of FIG. 10 having 252 houses in an area of 1 square kilometer. 35 of these houses are selected at random, and it is assumed that these houses are equipped with hardware that enables them to participate in a wireless mesh network. It is assumed that the communication range of the wireless technology is 200 meters, while the interference range is 400 meters. FIG. 11 illustrates the resulting network (i.e., the connectivity graph). A node can be selected that is roughly at the center of the area and designated to be the Internet access point. It is assumed that there are four senders. All the senders communicate with the Internet access point, and the metric of interest is the cumulative throughput of these senders. It is assumed that all wireless links are of unit capacity.

Beginning with a baseline case, for which a bidirectional MAC and single path routing are assumed, the linear program is set to optimize the sum of the throughputs of the four flows, with no consideration for fairness. In this case, with about 5000 units of effort, upper and lower bounds converge, and the model indicates that the maximum possible cumulative throughput is 0.5.

Turning to the question of how to improve the cumulative throughput, four possibilities are considered: (I) employ multi-path routing; (II) double the range of each radio (and also double the interference range); (III) leave the radio range unchanged, but use two non-overlapping channels instead of one (a node may communicate on only one of the two channels at any given time, but may switch between channels as often as necessary); and (IV) use two radios instead of one at each node (the radios are assumed to be tuned to two fixed, non-overlapping channels, so a node may communicate on the two channels simultaneously). The throughput bounds in each of the four scenarios are shown in Table 2. In each case, the upper and the lower bounds converge to the same value, which indicates that the solution is optimal.

TABLE 2

Throughputs for Neighborhood Mesh in Various Scenarios

| Scenario | Optimal Throughput |
|---|---|
| I | 0.5 |
| II | 0.5 |
| III | 1 |
| IV | 1 |

The results indicate that neither multi-path routing nor doubling the range of the radio increases cumulative throughput in the scenario considered. On the other hand, by using two channels instead of one, the network may achieve the maximum possible throughput of 1. The maximum possible throughput is 1 because the Internet access point has only one radio. On the other hand, even if two radios are used, the throughput remains at one. It is not hard to see why. The situation is equivalent to having two separate copies of the baseline network, and then adding up their throughputs. These scenarios illustrate that the model developed could be a useful tool for analysis and capacity planning in wireless multi-hop networks.

B. Tradeoff Between Connectivity and Throughput

In Section II, it was discussed how the model of the present invention can accommodate nodes which do not send data in a greedy fashion, i.e. they have a lower send rate. Gupta and Kumar and others have shown that the per node capacity in the network decreases as the number of nodes in the network goes up. These results, however, were derived under the assumption that each node sends data as fast as it can. In other words, the desired sending rate of the node is assumed to be 1. However, if each node has a lower desired sending rate, the richer connectivity provided by additional nodes might help increase per node throughput, by allowing better routes to be discovered. This hypothesis can be explored using the model of the present invention.

Consider a 7×7 grid, whose nodes are 200 meters apart horizontally, and vertically. It is assumed that the communication range is 250 meters, and the interference range is 500 meters. The link capacity is set to 1. A bidirectional MAC is assumed, similar to the one used to plot Chart 1. Single-path routing is used.

Figure 12:
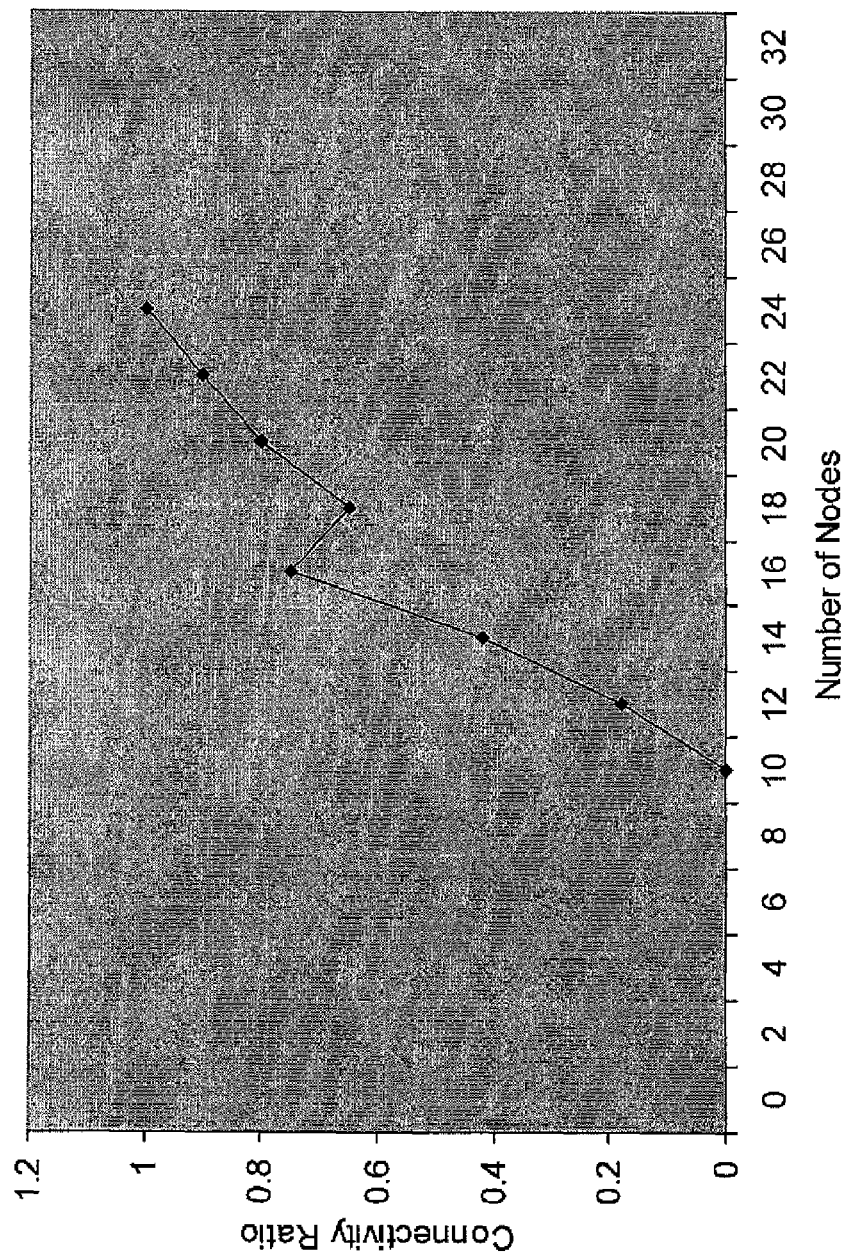
FIG. 12 is a graph plotting connectivity ratio against number of nodes.

N nodes are picked from the 49 available nodes, at random, and without replacement. Half of these nodes are designated as senders, and the other half are designated as receivers. The senders and the receivers form N/2 flows in the network. Each sender is paired with only one receiver. First the fraction of flows is calculated for which the source and the destination lie in the same connected component of the topology. This fraction is called the connectivity ratio. The connectivity ratio for various values of N is shown in FIG. 12. The results show that after 24 nodes (i.e. 12 flows) are selected, the connectivity ratio becomes 1.

Figure 13:
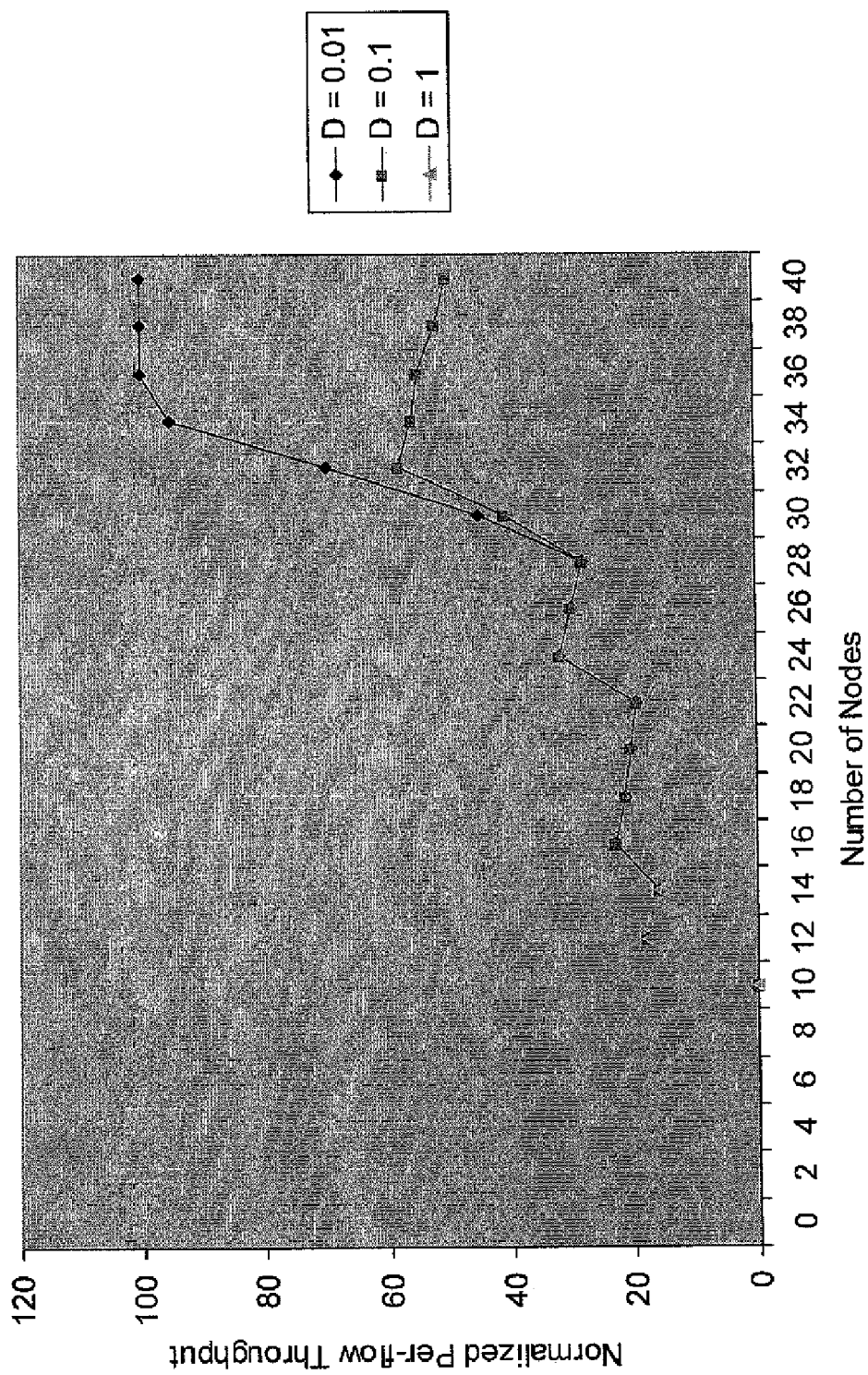
FIG. 13 is a graph plotting normalized per-flow throughput against number of nodes.
Figure 14:
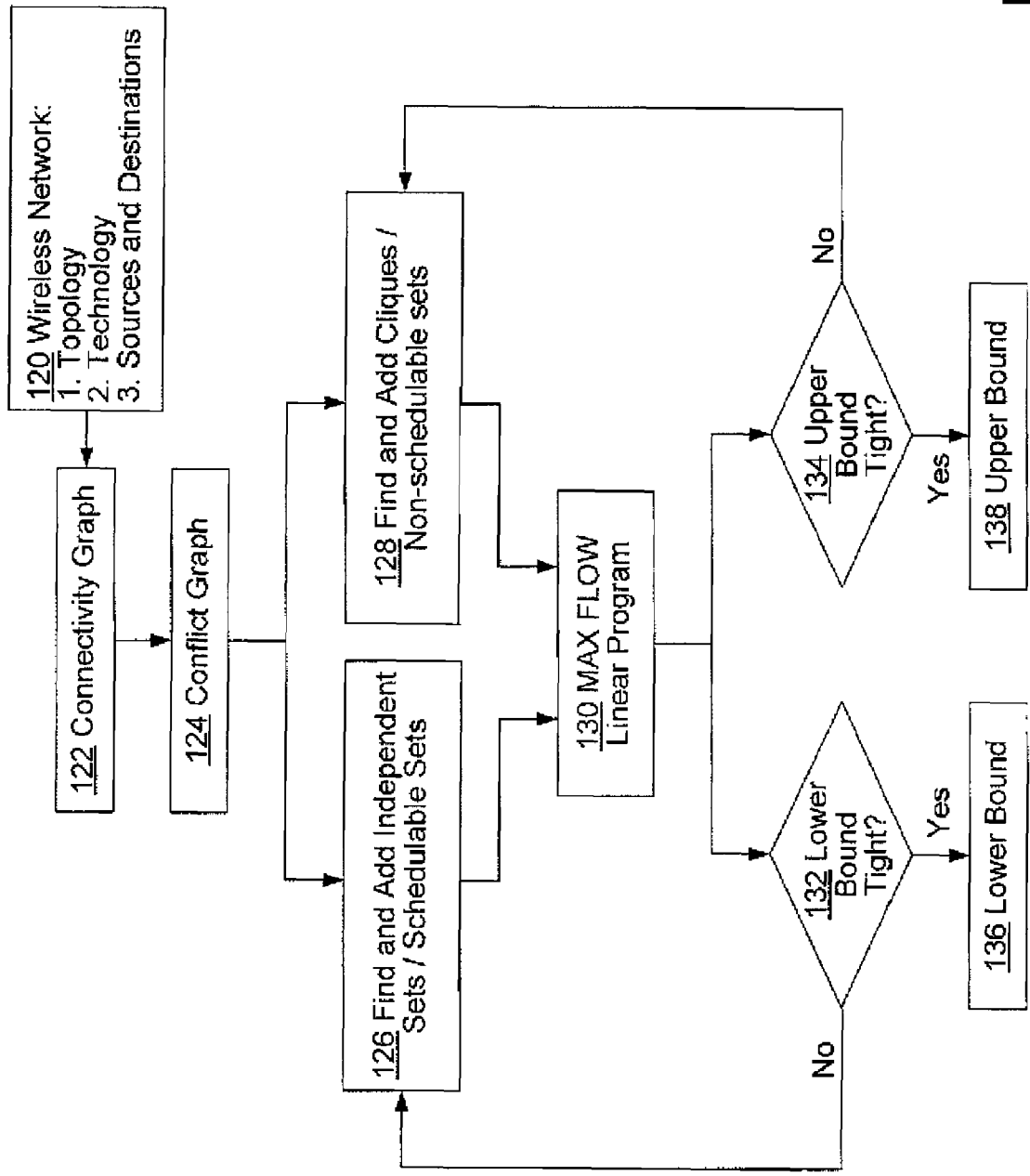
FIG. 14 is a flowchart illustrating the methods of the upper and lower bound computation.

A sending rate of D is then assigned to each sender. Then, using the model, the optimal throughput using single-path routing is calculated. The cumulative throughput is divided by the number of flows (i.e. N/2) to obtain average per-flow throughput, and normalize it further by dividing it by D. The resulting normalized per-flow throughput for various values of N and D is plotted in FIG. 13.

It should be noted that when the sending rate is 0.01, the normalized per-flow throughput continues to rise even after the connectivity has reached 1. This means that the richer connectivity provided by additional nodes allows for newer routes, and allows extra traffic to be sent through the network. However, if each node sends at rate 1, the node might have little capacity left to forward traffic from other nodes. Thus, the average per-flow throughput peaks early (i.e., the network is saturated), and then declines slowly, as new nodes join the network, but fail to transmit most of their desired traffic. For sending rate of 0.1, the results are between these two cases.

It is stressed that these results have been derived by assuming optimal routing, as well as optimal scheduling of packets. In the next section, there is further discussion of the impact of these two assumptions. Also it should be noted that a simple grid topology has been used in this example, and more experiments with complex topologies are needed to verify the generality of this result.

C. Benefits of Optimal Routing in Absence of Optimal Scheduling

As shown in the previous sections, the optimal throughput is achieved by selecting optimal routes and scheduling the links on the routes appropriately. A natural question to ask is how much performance improvement is due to the optimal route selection, and how much is due to the optimal scheduling. Motivated by this question, the four scenarios shown in Table 3 can be empirically examined. They correspond to (i) optimal routing with optimal scheduling; (ii) shortest-path routing with optimal scheduling; (iii) optimal routing under IEEE 802.11 standard MAC; and (iv) shortest-path routing under IEEE 802.11 standard MAC. The approach used to derive throughput for each case is first briefly described and then the results are presented.

TABLE 3

Four Scenarios

| | | Scheduling | |
|---|---|---|---|
| | | Optimal | IEEE 802.11 standard |
| Routing | Optimal | Optimal throughput (solve linear program) | Alternative routing scheme (ns simulation) |
| | Shortest-path | State of art under optimal scheduling (solve linear program) | State of art (ns simulation) |

Given a network topology, the algorithm described in Section II is applied to compute the optimal throughput under single-path routing. This corresponds to scenario (i).

To derive the performance of optimal routing under the IEEE 802.11 standard, ns-2 simulations (see Ns (network simulator), 1995, http://www.mash.cs.berkeley.edu/ns) are run. To ensure that the packets follow the optimal routes, the optimal routes obtained in Scenario (i) are specified as the static routes in ns-2. The throughput numbers from these simulations correspond to scenario (iii).

The simulation is then repeated using AODV (see Perkins, C. E., and Royer, E. M., "Ad-hoc on-demand distance vector routing," *Proc. of IEEE WMCSA '99*, February 1999), a standard shortest path routing protocol. The resulting throughput corresponds to the performance of the scenario (iv). To minimize the impact of AODV routing overhead, all nodes are static and simulations are run for 50 seconds, long enough to make the initial route setup overhead negligible.

Based on the AODV simulation results, a set of links is obtained that are used in the shortest paths between sources and destinations. The linear program formulation (from Section II) used to compute bounds on the optimal throughput is then modified by excluding all but those links that lie on one or more of the shortest paths (by setting the capacity of such links to zero). The resulting linear program is solved, and the throughput for scenario (ii) is obtained.

The aim is to compare throughput in scenario (i) to throughput in scenario (ii). Similarly, scenarios (iii) and (iv) are compared against each other. It should be noted that the throughput obtained by solving the linear program model and the throughput obtained from ns-2 simulations are not compared.

These four scenarios are considered in a 7×7 grid (49 nodes). The horizontal and vertical separation between adjacent nodes is 200 meters. The communication range is assumed to be 250 meters, and the interference range to be 500 meters. All other parameters are at their default settings in ns-2. For each simulation run, a few pairs of nodes are randomly picked as sources and destinations; the source sends packets to the corresponding destination at a constant bit rate equal to the wireless link capacity.

Table 4 shows the throughput ratios between optimal routing and shortest path routing, under optimal scheduling. These numbers are derived from the linear program formulation. In all cases, optimal routing yields comparable or better throughput than the shortest path routing when optimal scheduling is used. The benefit of optimal routing varies with the number of flows, as well as with the locations of communicating nodes. For instance, when the two flows are far apart and do not interfere with each other, the optimal path achieves the same throughput as the shortest path (e.g., numFlow=2 and run=1, 5); when the two flows interfere with each other, the optimal path takes a detour, which results in reduced interference and hence higher throughput (e.g., the case of numFlow=2 and run=2, 3, 4).

TABLE 4

Throughput Ratios Between Optimal Routing and Shortest-path Routing, Both Under Optimal Scheduling in a 7 × 7 Grid

| numFlow | run 1 | run 2 | run 3 | run 4 | run 5 |
|---|---|---|---|---|---|
| 2 | 1.00 | 1.25 | 1.6 | 1.3812 | 1.00 |
| 4 | 1.4092 | 1.0001 | 1.4369 | 1.4333 | 1.1429 |
| 8 | 2.1023 | 1.0000 | 1.0451 | 1.1131 | 1.1194 |

TABLE 5

Throughput Ratios Between "Optimal" Path Routing and Shortest-path Routing, Both Under IEEE 802.11 standard MAC in a 7 × 7 Grid

| numFlow | run 1 | run 2 | run 3 | run 4 | run 5 |
|---|---|---|---|---|---|
| 2 | 1.0768 | 2.4323 | 1.5278 | 1.7974 | 1.1863 |
| 4 | 1.0662 | 1.5374 | 0.7854 | 1.0181 | 1.5475 |
| 8 | 3.5474 | 1.2239 | 0.5011 | 1.1389 | 0.3905 |

Table 5 shows the throughput ratios between "optimal" routing and shortest path routing, under the 802.11 standard MAC. These numbers are based on ns-2 simulations. Optimal path outperforms the shortest path even under the 802.11 standard MAC when number of flows in the network is small. On the other hand, the optimal path routing does not always outperform the shortest path routing under 802.11 standard MAC; this is increasingly common when the number of flows is higher. This occurs because as network load increases, it is harder to find paths that do not interfere with other flows in the absence of optimal scheduling.

The above results are encouraging, and suggest that there is a potential to improve throughput by making route selection interference-aware.

D. Convergence of Upper and Lower Bounds

In most of the previous results in this section, the upper and the lower bounds converged, assuring the optimality of the solution. When they did not converge, e.g., FIG. 9, optimality of the lower bound was assured by manual verification. In general, however, the bounds may not converge, as there is no guarantee that even after adding all the clique constraints the upper bound will be schedulable. This leads to the question: how is a decision reached as to when to stop looking for even tighter bounds? Given that the conflict graph may have an arbitrarily complex structure, it is not practical to wait until the upper and lower bounds are within a small percentage of each other for this may never happen. Even after all the cliques are found, the upper bound may stay well above the optimal feasible solution. Thus, there is no easy way to decide when to stop the calculations. The data presented in the next does indicate, however, that convergence is quite good in many scenarios.

E. Computational Costs

An effort metric can be defined that provides a rough indication of the computational costs of finding the bounds. In Section II, the procedure for finding upper and lower bounds on throughput was described. Considering the protocol model of interference and focusing on the lower bound, it was shown that as more distinct independent sets are included, the lower bound becomes progressively tighter. In other words, the more effort spent looking for independent sets in the conflict graph, the better the bound will be. Since optimal solutions cannot always hoped to found, any upper or lower bounds discovered by the model need to be presented along with the amount of effort required to find those bounds. Thus a metric to measure this effort is required. The following simple algorithm is used to find distinct independent sets:
1.) Start with an empty independent set IS.
2.) Consider a random ordering of vertices in the conflict graph.
3.) Consider the vertices of the graph in that order. Always add the first vertex to IS.
4.) Add a new vertex if and only if it does not have an edge to any of the vertices added to IS so far (i.e., if it does not conflict with any of the existing vertices). Once all the vertices are considered, IS will be of size at least one.
5.) Check to see if this independent set has been previously discovered, and if not, add constraints based on this independent set to the linear program. Otherwise discard the set.

This entire sequence can be considered to be one unit of effort. It should be noted that one unit of effort does not always result in addition of a constraint or variable to the linear program. Moreover, there is a complex relationship between the number of variables and constraints in a linear program, and the amount of time required to solve it. Thus, the metric is only a rough guide for amount of actual time (or CPU cycles) spent while finding the bound. The effort metric is defined in a similar manner by considering cliques in case of searching for the upper bound, and by considering schedulable sets in case of the physical model.

As was mentioned above, the effort metric provides only a rough indication of the computational costs of finding the bounds. More data is now provided in this regard. It should be noted that much of the data provided is for the MATLAB solver (see Matlab version 6.1, http://www.matlab.com/); as noted below, the CPLEX solver (see Ilog cplex suite, 2003, http://www.ilog.com/products/cplex/) offered a speedup of about 7x, albeit on a somewhat faster CPU, hence there is the potential for significant improvements over the computational costs below.

Table 6 below considers the relationship between the size of the network and the amount of time required to compute upper and lower bounds. The table shows the bounds computed after 150,000 units of efforts for several grid sizes, and the time required to compute them. In each case, there is a single flow in the network, with its source and destination nodes at diagonally opposite corners of the grid. The rest of the parameters are similar to those used to plot FIG. 9. It should be noted that the upper and lower bounds are not equal in all cases, which indicates that the optimal solution might not have been found in all cases. The computations were done using MATLAB 6.1, on a machine with 1.7 Ghz Pentium processor, and 1.7 GB of RAM.

TABLE 6

Upper and Lower Bounds After 150,000 Units of Effort

| Grid Size | Upper Bound | Lower Bound | Time (minutes) |
|---|---|---|---|
| 3 × 3 | 0.25 | 0.25 | 2 |
| 5 × 5 | 0.5 | 0.5 | 2 |
| 7 × 7 | 0.495 | 0.5 | 25 |
| 9 × 9 | 0.474 | 0.5 | 35 |
| 11 × 11 | 0.479 | 0.5 | 40 |

Table 7 below considers the relationship between the amount of effort, and the closeness of upper and lower bounds, as well as the time required to compute those bounds. The results are based on the 7×7 grid, with rest of the parameters similar to those used for Table 6. As discussed above, with more effort, more variables are likely to be added as well as more restrictive constraints in the linear program. Thus, the bounds become tighter.

TABLE 7

Upper and Lower Bounds After Varying Effort for a 7 × 7 Grid

| Effort | Upper Bound | Lower Bound | Time (minutes) |
|---|---|---|---|
| 10000 | 0.443 | 0.5 | 2 |
| 50000 | 0.48 | 0.5 | 5 |
| 100000 | 0.49 | 0.5 | 13 |
| 150000 | 0.495 | 0.5 | 25 |
| 200000 | 0.5 | 0.5 | 41 |

Table 8 below considers the relationship between the number of flows in the network, and the amount of time required to compute bounds for a given amount of effort. The results are based on a 7×7 grid, with multiple flows. For each flow, the source is in the bottom row of the grid, and it communicates with a destination located in the same column, but in the top row. All other parameters are same as Table 6.

TABLE 8

7 × 7 Grid, Multiple Flows, 150,000 Units of Effort

| Number of flows | Upper Bound | Lower Bound | Time (minutes) |
|---|---|---|---|
| 2 | 0.578 | 0.583 | 34 |
| 3 | 0.707 | 0.75 | 31 |
| 4 | 0.758 | 0.833 | 29 |
| 5 | 0.799 | 0.875 | 31 |
| 6 | 0.849 | 0.925 | 34 |
| 7 | 0.861 | 1.00 | 36 |

The software used to solve the linear program is also a significant factor in the amount of time required to find the optimal solution. Table 9 below shows the amount of time taken by CPLEX to solve the 7×7 grid case, with 6 and 7 flows on a 2.7 GHz Pentium machine, with 3.7 GB of RAM. While these entries cannot be compared directly with the corresponding entries in Table 8, as the machines used to run MATLAB and CPLEX are different, the speedup is still quite significant: a reduction by a factor of 7, from 34-36 minutes down to 5 minutes. Moreover, MATLAB cannot solve the Mixed Integer Programs that result when single-path routing is used. These can only be solved using CPLEX.

TABLE 9

7 × 7 Grid, Multiple Flows, 150,000 Units of Effort, with CPLEX

| Number of flows | Upper Bound | Lower Bound | Time (minutes) |
|---|---|---|---|
| 6 | 0.849 | 0.925 | 5 |
| 7 | 0.861 | 1.00 | 5 |

Since these numbers are based on a single run, and are based only on grid graphs, which have a regular connectivity pattern, general conclusions cannot be drawn from them. However, some trends are useful to note. It is observed that for grid networks, the amount of time required to solve the problem increases with the number of nodes. Also, it is seen that for a given effort level, the time required to compute the bounds does not depend significantly on the number of flows in the network. However, the difference between the upper and lower bounds for a given amount of effort tends to increase with increase in number of flows.

In case of irregular graphs, the amount of time required to solve has been observed to depend significantly on connectivity and interference patterns.

In view of the many possible embodiments to which the principles of this invention may be applied, it should be recognized that the embodiments described herein with respect to the drawing figures are meant to be illustrative only and should not be taken as limiting the scope of invention. For example, for performance reasons the model and method of the present invention may be implemented in hardware, rather than in software. Therefore, the invention as described herein contemplates all such embodiments as may come within the scope of the following claims and equivalents thereof.

What is claimed is:

1. A method for improving throughput in a wireless network, the method comprising:

accepting connectivity information for the network;

identifying wireless links between nodes of the network from the connectivity information;

representing each identified link as a vertex;

creating a directional edge between a first vertex and a second vertex if the corresponding wireless links interfere with one another;

assigning to the edge a weight equal to a fraction of a maximum permissible noise at a link corresponding to the second vertex contributed by activity on the link corresponding to the first vertex;

collecting the edge and weight information at a centralized location; and using the edge and weight information to determining routing paths.

2. The method of claim 1 wherein the connectivity information is represented by a connectivity graph.

3. A non-transitory computer-readable medium containing instructions for performing a method for improving throughput in a wireless network, the method comprising:

accepting connectivity information for the network;

identifying wireless links between nodes of the network from the connectivity information;

representing each identified link as a vertex;

creating a directional edge between a first vertex and a second vertex if the corresponding wireless links interfere with one another;

assigning to the edge a weight equal to a fraction of a maximum permissible noise at a link corresponding to the second vertex contributed by activity on the link corresponding to the first vertex;

collecting the edge and weight information at a centralized location; and using the edge and weight information to determining routing paths.

* * * * *